United States Patent
Mori

(10) Patent No.: US 6,904,349 B2
(45) Date of Patent: Jun. 7, 2005

(54) METHOD OF ESTIMATING QUANTITIES THAT REPRESENT STATE OF VEHICLE

(75) Inventor: Atsushi Mori, Kanuma (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 63 days.

(21) Appl. No.: 10/409,283

(22) Filed: Apr. 8, 2003

(65) Prior Publication Data

US 2003/0195689 A1 Oct. 16, 2003

(30) Foreign Application Priority Data

Apr. 16, 2002 (JP) ........................................ 2002-113715

(51) Int. Cl.$^7$ .......................... B60K 26/00; B60Q 1/00; B60Q 1/26
(52) U.S. Cl. .............................. 701/70; 701/74; 340/429
(58) Field of Search ............................. 701/70, 74, 41, 701/80, 73, 90, 48, 58; 340/429, 440, 441; 303/149, 150, 140, 146, 148; 180/197; 280/124.106, 5.51

(56) References Cited

U.S. PATENT DOCUMENTS

| | | | | |
|---|---|---|---|---|
| 5,762,157 A | * | 6/1998 | Uehara | ........................ 180/197 |
| 6,266,601 B1 | * | 7/2001 | Soga et al. | ..................... 701/74 |
| 6,453,226 B1 | * | 9/2002 | Hac et al. | ...................... 701/48 |
| 6,549,842 B1 | * | 4/2003 | Hac et al. | ...................... 701/80 |
| 6,614,343 B1 | * | 9/2003 | Fennel et al. | ............. 340/425.5 |

* cited by examiner

Primary Examiner—Richard M. Camby
Assistant Examiner—Dalena Tran
(74) Attorney, Agent, or Firm—Merchant & Gould P.C.

(57) ABSTRACT

A method is provided capable of improving the accuracy of estimations of quantities that represent the state of a vehicle, such as vehicle speed, wheel slip ratio, wheel speed along the ground, longitudinal wheel force and the vehicle body sideslip angle, or values related to the quantities that represent the vehicle state, using a simple and inexpensive method. A tire longitudinal force computing unit 81 calculates longitudinal forces $F_1$ to $F_4$ of each of the wheels by substituting a coefficient of friction $\mu$, which is adjusted such that a deviation between a detected value of a longitudinal acceleration $G_x$ and an estimated longitudinal acceleration $G_{xe}$ is zero, an estimated vehicle speed $V_e$, slip ratios $S_1$ to $S_4$ of each of the wheels calculated based on detected values of sensors 11 and 31, loads $W_1$ to $W_4$ of each of the wheels, calculated based on detected values of sensors 12 and 61, and lateral forces $Y_1$ to $Y_4$, into an equation related to a predetermined tire dynamics model. A longitudinal acceleration estimating unit 82 calculates an estimated longitudinal acceleration $G_{xe}$ based on the longitudinal forces $F_1$ to $F_4$ and a predetermined movement equation. An integrator 43 integrates with respect to time the estimated longitudinal acceleration $G_{xe}$, and calculates an estimated vehicle speed $V_e$.

8 Claims, 15 Drawing Sheets

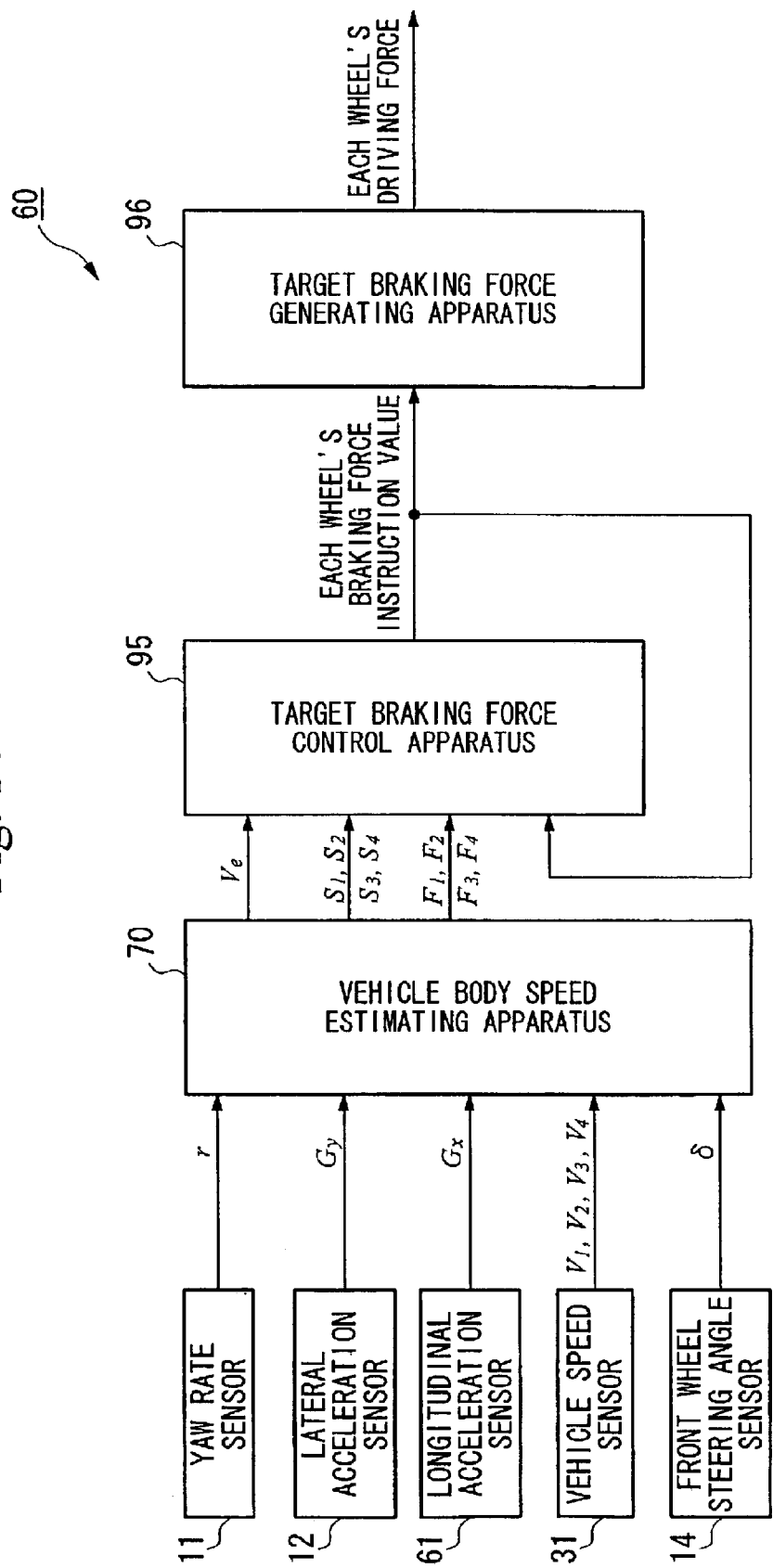

METHOD OF ESTIMATING QUANTITIES THAT REPRESENT STATE OF VEHICLE

BACKGROUND OF THE INVENTION

1. Field of the Invention

The present invention relates to a method of estimating quantities that represent the state of a vehicle, such as the speed of the vehicle, the slip rate of the wheels, the speed of the wheels along the ground, the longitudinal force that acts on the wheels, and the vehicle body sideslip angle.

2. Description of the Related Art

Conventionally, a control method is known for improving the moving state of a vehicle by using the quantities that represent the vehicle state, such as the vehicle body sideslip angle $\beta$ (that is, the angle between the forward direction of the vehicle and the longitudinal axis of the vehicle) when controlling the state of movement of the vehicle during a turning movement, for example. In this type of control, a method is known wherein, in the case that, for example, the vehicle body sideslip angle $\beta$ is used, the yaw rate r detected by a yaw rate sensor (that is, the turning angle velocity of the vehicle center of gravity around the axis in the vertical direction), the lateral acceleration $G_y$ detected by the lateral acceleration sensor (that is, the acceleration or deceleration added in the lateral direction of the vehicle), and the velocity V of the vehicle (vehicle speed) detected by the vehicle velocity sensor are substituted into the following equation (1), which is derived from the equation representing the physical relations of the quantities that represent the state of the movement of the vehicle, and by carrying out integration with respect to time, the vehicle body sideslip angle $\beta$ is estimated.

However, in methods in which the results of the detected quantities from each of the sensors are integrated with respect to time, the influence of noise in each of the sensors, the error included in the results of the detected quantities, and the deviations in the calibrations of each of the sensors accumulate, and thus there is the concern that the precision of the estimation of the vehicle body sideslip angle $\beta$ deteriorates.

$$\beta = \int \left( \frac{G_y}{V} - r \right) dt \qquad (1)$$

In response to these problems, the method of estimating the vehicle body sideslip angle and the estimation apparatus disclosed, for example, in Japanese Unexamined Patent Application, First Publication, No. Hei 11-78933 is known. In this method, models of a plurality of wheels are introduced, and the vehicle body sideslip angle $\beta$ is estimated by switching the model for the wheels depending on, for example, the case that the coefficient of friction of the road surface changes, or the various conditions during travel in the critical vicinity of movement of the vehicle (that is, the critical zone in which there is the possibility that the state of movement of the vehicle may become unstable when there is no control of any kind).

However, in the vehicle body sideslip angle estimation method and estimation apparatus according to the example of conventional technology described above, there are the problems that the computation processing of the vehicle body sideslip angle $\beta$ becomes complicated, and that the computation load increases.

Furthermore, there are cases in which the estimated value of the vehicle body sideslip angle $\beta$ drastically changes due to the timing during which the models of a plurality of wheels are switched, and thus there is a concern that the driveability will degrade.

Moreover, when detecting vehicle speed V using a vehicle speed sensor, in a case where the vehicle speed V is calculated based on signals from wheel speed sensors, which measure the rotating speed of each of the wheels for example, if the slip ratio of any wheel increases, the problem arises that it is difficult to calculate the vehicle speed V accurately.

For such a problem, if the vehicle speed V is calculated by integrating an output from an acceleration sensor, which detects the acceleration of the vehicle, with respect to time, there is a problem that noise and measurement errors when measuring, discrepancies in the calibration of the acceleration sensor, and the like, are accumulated. For example, in the case where the running conditions of a vehicle are controlled based on the vehicle speed V, especially if the output from the acceleration sensor is integrated with respect to time over a long period, the error in the vehicle speed V increases excessively, and thus there is a concern that appropriate control is difficult.

SUMMARY OF THE INVENTION

In consideration of the problems described above, it is an object of the present invention to provide a method of estimating for the quantities representing the state of the vehicle that can improve the precision of the estimations of the quantities that represent the vehicle state, such as the vehicle speed, wheel slip ratio, wheel speed along the ground, longitudinal wheel force and the vehicle body sideslip angle, or values related to the quantities that represent the vehicle state using a simple and inexpensive method.

In order to solve the problems and attain the objects described above, a first aspect of the present invention provides a method of estimating quantities that represent the vehicle state comprises the steps of: setting initial values (for example, step S01 and step S11 in the embodiments described below) to characteristic values related to the vehicle characteristics (for example, the coefficient of friction $\mu$, the front wheel cornering power $K_f$, and the rear wheel cornering power $K_r$, in the embodiments described below); calculating (for example, step S03, step S04, step S15, step S16 and step S19 in the embodiments described below) required quantities that represent the vehicle state (for example, estimated vehicle speed $V_e$, slip ratios $S_1$ to $S_4$, ground speeds $V_{e1}$ to $V_{e4}$, longitudinal forces $F_1$ to $F_4$, and vehicle body sideslip angle $\beta$, in the embodiments described below) or values related to the required quantities that represent the vehicle state, by applying the initial values to a prescribed movement equation (for example, equations (5) to (10), equation (13), equation (17) to equation (18), and equation (20) to equation (24) in the embodiments described below); verifying (for example, step S07 and step S18 in the embodiments described below) the required quantities that represent the vehicle state, or values related to the required quantities that represent the vehicle state, calculated by said movement equation, using measurable quantities that represent the vehicle state (for example, the lateral acceleration $G_y$ and the longitudinal acceleration $G_x$ in the embodiments described below); and correcting the initial values (for example, step S08 and step S20 in the embodiments described below), according to the results of the verification.

According to the method of estimating quantities that represent the vehicle state described above, when calculating required quantities that represent the vehicle state or values related to the required quantities that represent the vehicle state, appropriate initial values are first substituted into unknown variables in a movement equation. Then, measurable quantities that represent the vehicle state are described based on the calculated required quantities that represent the vehicle state or values related to the required quantities that represent the vehicle state. Then, the described quantities that represent the vehicle state and physically measured quantities that represent the vehicle state are compared, and the appropriate initial values are corrected such that the difference between the two is zero, for example. The corrected initial values are then substituted into a prescribed movement equation, and the processes described above are repeated.

In this manner, even in the case where the required quantities that represent the vehicle state or values related to the required quantities that represent the vehicle state, calculated by the prescribed movement equation, are different from measurable quantities that represent the vehicle state, it is possible to improve the accuracy of the required quantities that represent the vehicle state or values related to the required quantities that represent the vehicle state by repeatedly correcting the initial values substituted into the movement equation.

According to a second aspect of the present invention, a method of estimating quantities that represent the vehicle state comprises the steps of: setting initial values (for example, step S01 and step S11 in the embodiments described below) to characteristic values related to the vehicle characteristics (for example, the coefficient of friction $\mu$, the front wheel cornering power $K_f$, and the rear wheel cornering power $K_r$ in the embodiments described below); calculating (for example, step S03, step S15, and step S16 in the embodiments described below) required differential values (for example, vehicle body sideslip angle differential value $\beta'$, and estimated longitudinal acceleration $G_{xe}$ in the embodiments described below) of quantities that represent the vehicle state (for example, estimated vehicle speed $V_e$, slip ratios $S_1$ to $S_4$, ground speeds $V_{e1}$ to $V_{e4}$, longitudinal forces $F_1$ to $F_4$, vehicle body sideslip angle $\beta$ in the embodiments described below) or differential values (for example, differential value $V_y'$) of values related to the required quantities that represent the vehicle state, by applying the initial values to a prescribed movement equation (for example, equations (5) to (10), equation (13), equation (17) to equation (18), equation (20) to equation (24) in the embodiments described below); verifying (for example, step S07 and step S18 in the embodiments described below) the differential values of the required quantities that represent the vehicle state, or the differential values of the values related to the required quantities that represent the vehicle state, calculated by the movement equation, using measurable quantities that represent the vehicle state (for example, the lateral acceleration $G_y$, and the longitudinal acceleration $G_x$ in the embodiments described below); correcting the initial values (for example, step S08 and step S20 in the embodiments described below), according to the results of the verification, calculating (for example, step S04 and step S19 in the embodiments described below) the required quantities that represent the vehicle state or values related to the required quantities that represent the vehicle state, by integrating the differential values of the required quantities that represent the vehicle state or the differential values of the values related to the required quantities that represent the vehicle state, calculated by the movement equation; and using (for example, step S03 and step S20 are common to the embodiments described below) the calculated required quantities that represent the vehicle state, or values related to said required quantities that represent the vehicle state, for the calculation of the differential values of the required quantities that represent the vehicle state, or the differential values of the values related to the required quantities that represent the vehicle state, in the subsequent processes.

According to the method of estimating quantities that represent the vehicle state described above, when calculating required quantities that represent the vehicle state or values related to the required quantities that represent the vehicle state, appropriate initial values are first substituted into unknown variables in a movement equation, and differential values of the required quantities that represent the vehicle state or differential values of values related to the required quantities that represent the vehicle state are calculated.

Then, measurable quantities that represent the vehicle state are described based on the calculated differential values of the required quantities that represent the vehicle state or the differential values of the values related to the required quantities that represent the vehicle state. Then the described quantities that represent the vehicle state and physically measured quantities that represent the vehicle state are compared, and the appropriate initial values are corrected such that the difference between the two is zero, for example. The required quantities that represent the vehicle state or values related to the required quantities that represent the vehicle state, which are obtained by integrating the calculated differential values of the required quantities that represent the vehicle state or differential values of the values related to the required quantities that represent the vehicle state are then substituted into a prescribed movement equation together with the corrected initial values, and the processing described above is repeated.

In this manner, even in the case where the differential values of the required quantities that represent the vehicle state or the differential values of the values related to the required quantities that represent the vehicle state calculated by the prescribed movement equation are different from measurable quantities that represent the vehicle state, it is possible to improve the accuracy of the required quantities that represent the vehicle state or values related to the required quantities that represent the vehicle state by repeatedly correcting the initial values to be substituted into the movement equation.

Furthermore, since verification is performed based on the differential values of the required quantities that represent the vehicle state or the differential values of the values related to the required quantities that represent the vehicle state, compared with the case where verification is performed based on the values obtained by integrating these differential values, it is possible to prevent errors from being accumulated by integration computation, thus enabling accurate verification.

Moreover, when calculating the differential values of the required quantities that represent the vehicle state or the differential values of the values related to the required quantities that represent the vehicle state, by using the required quantities that represent the vehicle state or the values related to the required quantities that represent the vehicle state, which are obtained in the previous processing, recursive calculations are performed, so that it is possible to prevent the required quantities that represent the vehicle state or the values related to the required quantities that represent the vehicle state, which are calculated by integration computation, from diverging.

That is, since the required quantities that represent the vehicle state or the values related to the required quantities that represent the vehicle state tend to converge by repeating a recursive calculation process, these values are prevented from changing significantly, so that it is possible to guarantee stable control of the vehicle travel behavior based on those values.

Furthermore, in a method of estimating quantities that represent the vehicle state according to a third aspect of the invention, the required quantities that represent the vehicle state are at least any one of vehicle speed (for example, estimated vehicle speed $V_e$ in the embodiments described later), wheel slip ratio (for example, slip ratios $S_1$ to $S_4$ in the embodiments described later), wheel speed along the ground (for example, ground speeds $V_{e1}$ to $V_{e4}$ in the embodiments described later) and longitudinal wheel force (for example, longitudinal forces $F_1$ to $F_4$ in the embodiments described later), the characteristic value related to the vehicle characteristics is a characteristic value related to tire characteristics (for example, coefficient of friction $\mu$ in the embodiments described later), and the measurable quantity that represents the vehicle state is longitudinal acceleration (for example, longitudinal acceleration $G_x$ in the embodiments described later).

According to the method of estimating the quantities that represent the vehicle state described above, first, an appropriate initial value is substituted into a characteristic value related to tire characteristics as an unknown variable in a movement equation. Then, based on required quantities that represent the vehicle state or differential values of the required quantities that represent the vehicle state consisting of at least any one of the vehicle speed, the wheel slip ratio, the wheel speed along the ground and the longitudinal wheel force, the longitudinal acceleration (that is, acceleration or deceleration added in the longitudinal direction of the vehicle) is estimated as a measurable quantity that represents the vehicle state. Then, the estimated longitudinal acceleration and physically measured longitudinal acceleration are compared, and the initial value of the characteristic value related to tire characteristics is corrected such that the difference between the two is zero, for example. Then, the corrected initial value is substituted into a prescribed movement equation, and the processes described above are repeated.

In this manner, by repeatedly correcting the initial value to be substituted into the movement equation, even in the case where the characteristic value related to tire characteristics changes significantly due to a change in the road surface for example, it is possible to improve the accuracy of the calculated required quantities that represent the vehicle state or the values related to the required quantities that represent the vehicle state.

Moreover, a method of estimating quantities that represent the vehicle state according to a fourth aspect of the invention, comprises the step (for example, step S20 is common to the embodiments described later) of controlling the driving force or braking force of a vehicle, based on calculation results of at least any one of the vehicle speed (for example, estimated vehicle speed $V_e$ in the embodiments described later), the wheel slip ratio (for example, slip ratios $S_1$ to $S_4$ in the embodiments described later), the wheel speed along the ground (for example, ground speeds $V_{e1}$ to $V_{e4}$ in the embodiments described later) and longitudinal wheel force (for example, longitudinal forces $F_1$ to $F_4$ in the embodiments described later).

According to the method of estimating the quantities that represent the vehicle state described above, when controlling the travel behavior of the vehicle, a required driving force or braking force can be guaranteed, and at the same time it is possible to correct dispersion in output characteristics due to physical differences in a generating unit or a braking force generating unit for example, age related changes, and the like.

Furthermore, a method of estimating quantities that represent the vehicle state according to a fifth aspect of the invention, comprises the step (for example, step S20 is common to the embodiments described later) of controlling the steering angle or steering force of a steering wheel, based on calculation results of at least any one of the vehicle speed (for example, estimated vehicle speed $V_e$ in the embodiments described later), the wheel slip ratio (for example, slip ratios $S_1$ to $S_4$ in the embodiments described later), the wheel speed along the ground (for example, ground speeds $V_{e1}$ to $V_{e4}$ in the embodiments described later) and longitudinal wheel force (for example, longitudinal forces $F_1$ to $F_4$ in the embodiments described later).

According to the method of estimating the quantities that represent the vehicle state described above, even in the case where the travel behavior of the vehicle changes according to the steering angle of the front wheels and the rear wheels, the required travel behavior can be guaranteed, and at the same time, it is possible to generate a steering force to assist the driver's steering appropriately according to the travel behavior of the vehicle, for example.

Moreover, in a method of estimating quantities that represent the vehicle state according to a sixth aspect of the invention, the required quantity that represents the vehicle state is vehicle body sideslip angle (for example, the vehicle body sideslip angle $\beta$ in the embodiments described later), a characteristic value related to the vehicle characteristics is a characteristic value related to tire characteristics (for example, the front wheel cornering power $K_f$, the rear wheel cornering power $K_r$, or the coefficient of friction $\mu$, in the embodiments described below), and the measurable quantity that represents the vehicle state is lateral acceleration (for example, the lateral acceleration $G_y$ in the embodiments described below).

According to the method of estimating the quantities that represent the vehicle state described above, first, an appropriate initial value is substituted into a characteristic value related to tire characteristics as an unknown variable in a movement equation. Then, based on the vehicle body sideslip angle, values related to the vehicle body sideslip angle, or the differential values thereof, the lateral acceleration is estimated as a measurable quantity that represents the vehicle state. Then, the estimated lateral acceleration and physically measured lateral acceleration are compared, and the initial value of the characteristic value related to tire characteristics is corrected such that the difference between the two is zero, for example. Then, the corrected initial value is substituted into a prescribed movement equation, and the processes described above are repeated.

In this manner, by repeatedly correcting the initial value to be substituted into the movement equation, even in the case where the characteristic value related to tire characteristics changes significantly due to a change in the road surface or the like for example, it is possible to improve the accuracy of the calculated vehicle body sideslip angle, values related to the vehicle body sideslip angle, or differential values thereof.

BRIEF DESCRIPTION OF THE DRAWINGS

FIG. 14 is a functional block diagram showing the processing flow of a first modification of the vehicle control system according to the second embodiment of the present invention shown in FIG. 10.

DETAILED DESCRIPTION OF THE INVENTION

Below, the method of estimating quantities that represent the vehicle state according to an embodiment of the present invention will be explained with reference to the attached drawings.

Figure 1:
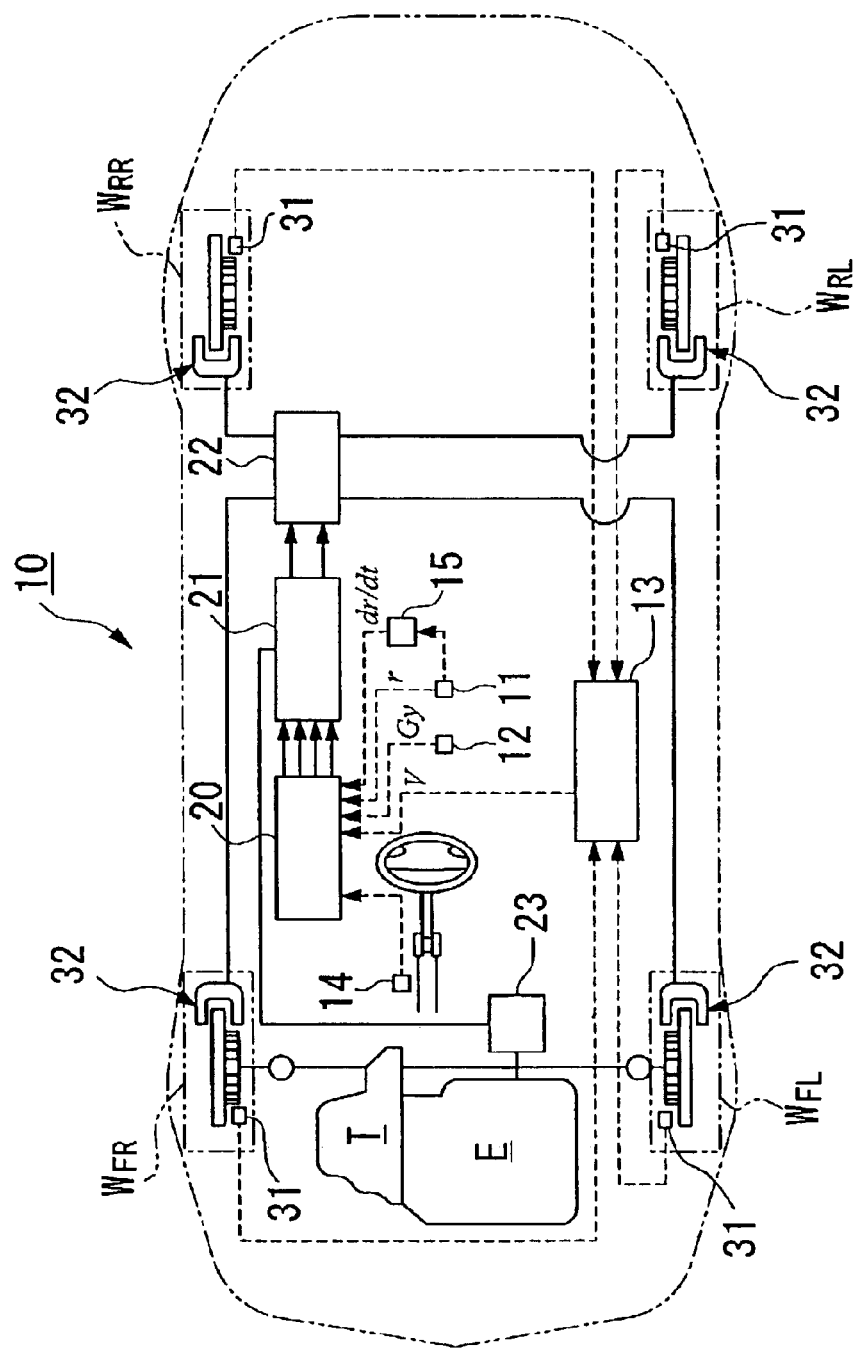
FIG. 1 is a structural diagram of a vehicle control system that realizes a method for estimating the quantities that represent the vehicle state according to a first embodiment of the present invention.
Figure 2:
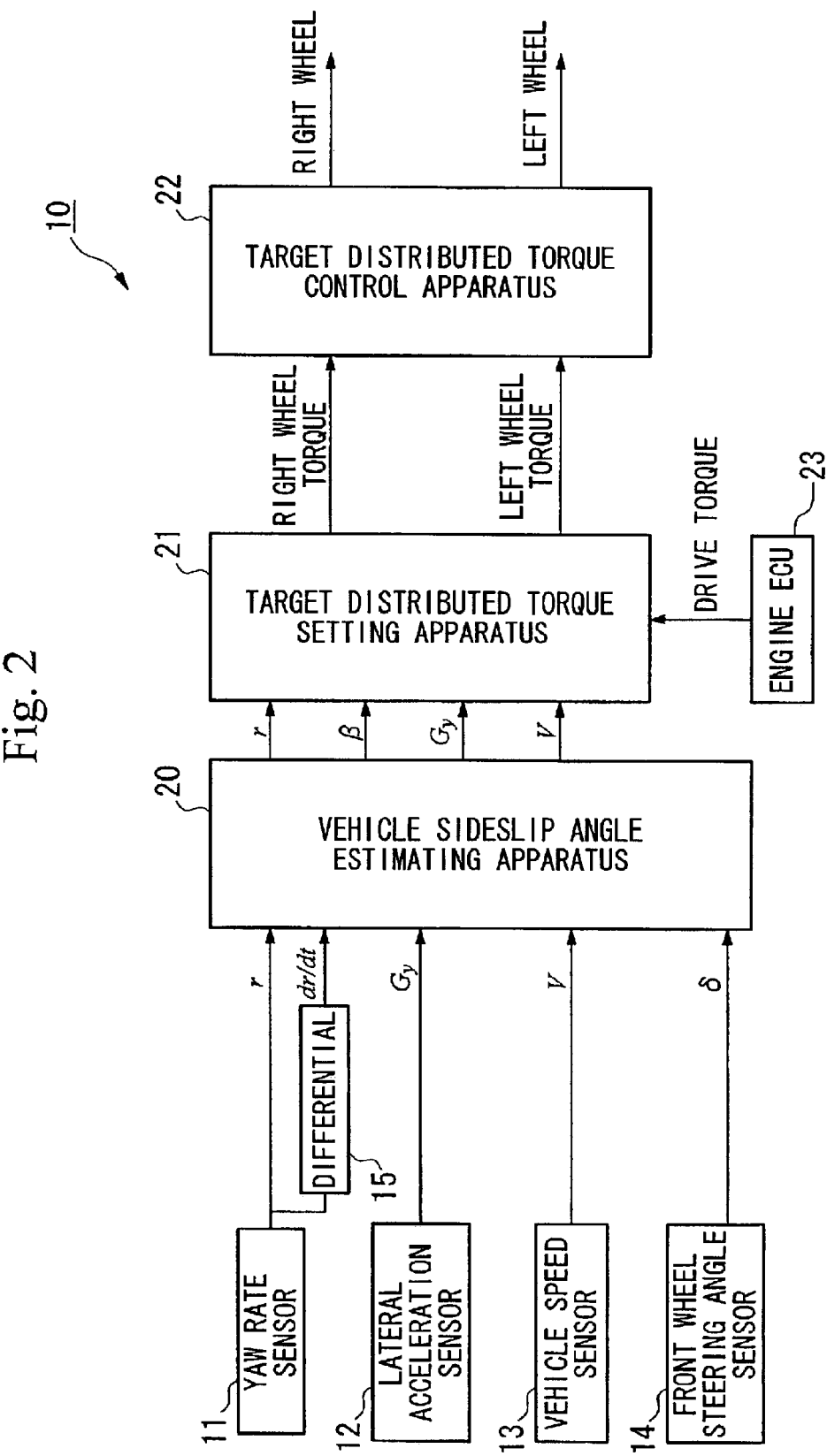
FIG. 2 is a structural diagram of the vehicle control system that realizes the method for estimating the quantities that represent the vehicle state according to the first embodiment of the present invention.
Figure 3:
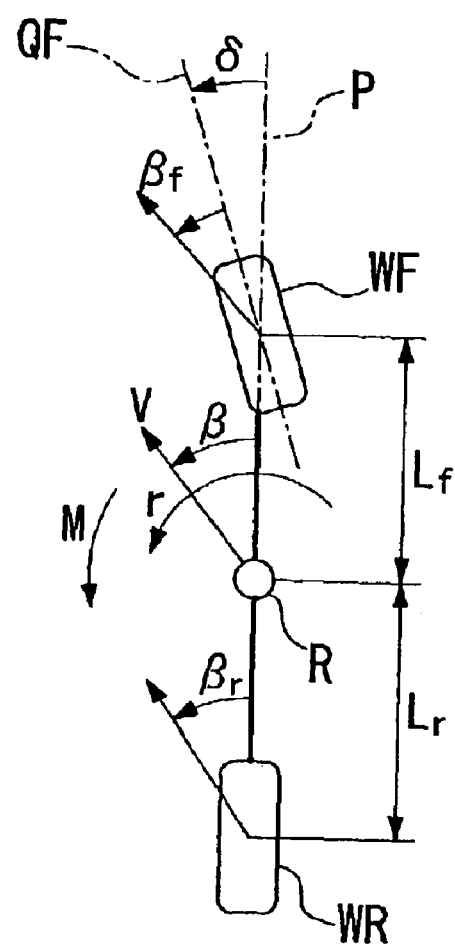
FIG. 3 is a schematic diagram showing a two-wheel diagram in the two-wheel model.
Figure 4:
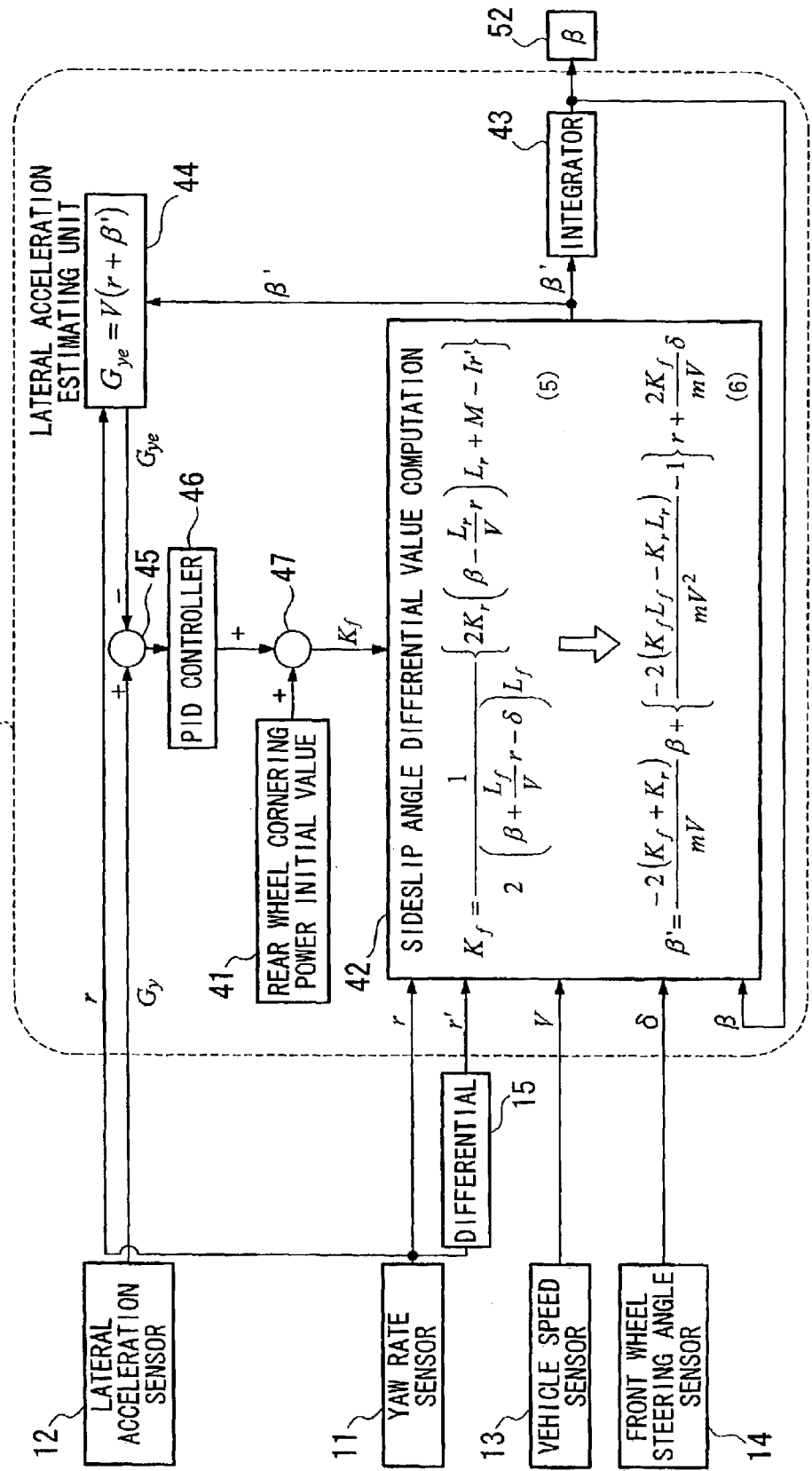
FIG. 4 is a functional block diagram showing an example of the processing flow in the vehicle body sideslip angle estimating apparatus shown in FIG. 1 and FIG. 2.

FIG. 1 and FIG. 2 are structural diagrams of the vehicle control system that realizes the method for estimating the quantities that represent the vehicle state according to an embodiment of the present invention; FIG. 3 is a schematic diagram showing a two-wheel diagram in the two wheel model; FIG. 4 is a functional block diagram showing an example of the processing flow in the vehicle body sideslip angle estimating apparatus 20 shown in FIG. 1 and FIG. 2.

The vehicle control system 10 according to the present embodiment comprises, as shown for example in FIG. 1 and FIG. 2, a yaw rate sensor 11, a lateral acceleration sensor 12, a vehicle speed sensor 13, a front wheel steering angle sensor 14, a yaw rate differential value calculating unit 15, a vehicle body sideslip angle estimating apparatus 20, a target distributed torque setting apparatus 21, a target distributed torque control apparatus 21, and an engine ECU 23.

The yaw rate sensor 11 comprises a piezoelectric element, a gyro sensor, or the like, that detects the amount of the change in the angle of inclination with respect to the heading of the vehicle on a horizontal plane or in a vertical direction, and a signal having a voltage level that depends on the size of the result of detecting the yaw rate r (that is, the turning angle velocity of the vehicle center of gravity around the axis in the vertical direction) is output to a yaw rate differential value calculating unit 15 and a vehicle body sideslip angle estimating apparatus 20.

The lateral acceleration sensor 12 detects the lateral acceleration $G_y$, which is the acceleration (or deceleration) added in the lateral direction of the vehicle, and outputs the signal having a voltage level that depends on the detected result to the vehicle body sideslip angle estimating apparatus 20.

The vehicle speed sensor 13 detects the velocity V of the vehicle (vehicle speed V) from the velocities of each of the vehicle wheels (that is, the turn angle velocities of each of the vehicle's wheels) by a plurality of vehicle wheel speed sensors 31 provided on each of the vehicle wheels $W_{FR}$, $W_{FL}$, $W_{RR}$, $W_{RL}$, and outputs a signal having a voltage level that depends on the size of this detected result to the vehicle body sideslip angle estimating apparatus 20.

The front wheel steering angle sensor 14 comprises a rotary encoder or the like provided, for example, on the steering axle, and by subtracting the steering angle, comprising the direction and size of the steering angle input by the driver, from the steering gear ratio of the front wheel steering system, the front wheel steering angle δ (that is, the angle δ formed between the longitudinal axis P of the vehicle and the longitudinal direction QF of the front wheels) is detected, and a signal having a voltage level that depends on the size of the detected result is output to the vehicle body sideslip angle estimating apparatus 20.

The vehicle body sideslip estimating apparatus 20 estimates the vehicle body sideslip angle β (that is, the angle between the forward direction of the vehicle (for example, the direction of the vehicle speed V) and the longitudinal axis P of the vehicle) as a quantity that represents the vehicle state based on the following equations (2) and (3) according to the predetermined movement model of a vehicle (for example, the two wheel model), and outputs the estimated vehicle body sideslip angle β to the target distributed torque setting apparatus 21.

The target distributed torque setting apparatus 21 sets the target value of the distributed torque that is distributed over the right and left front and rear wheels of the vehicle based on the vehicle body sideslip angle β estimated in the vehicle body sideslip estimating apparatus 20, the yaw rate r of the vehicle detected by the yaw rate sensor 11, the lateral acceleration $G_y$ of the vehicle detected by the lateral acceleration sensor 12, the vehicle speed V detected by the vehicle speed sensor 13, and the drive torque calculated by the engine ECU 23, and outputs the calculated right wheel torque and left wheel torque to the target distributed torque control apparatus 22.

In addition, the target distributed torque control apparatus 22, for example, adds a driving force appropriate for each of the vehicle wheels $W_{FR}$, $W_{FL}$, $W_{RR}$, $W_{RL}$ or a desired yawing moment M by applying a damping force depending on the state of the operation of the vehicle. For example, the target distributed torque control apparatus 22 may carry out control so that a plurality of brake devices 32 provided on each of the wheels $W_{FR}$, $W_{FL}$, $W_{RR}$, $W_{RL}$ are actuated, and the actual value of the each of the torques of the left and right wheels is equal to each of the target values of the right wheel torque and the left wheel torque.

$$mV(r+\beta') = -2K_f\left(\beta + \frac{L_f}{V}r - \delta\right) - 2K_r\left(\beta - \frac{L_r}{V}r\right) \quad (2)$$

$$Ir' = -2K_f\left(\beta + \frac{L_f}{V}r - \delta\right)L_f + 2K_r\left(\beta - \frac{L_r}{V}r\right)L_r + M \quad (3)$$

$$G_{ye} = V(r+\beta') \quad (4)$$

Here, among the movement models for the vehicle that describe the yaw movement of the vehicle, that is, the rotational movement of the center of gravity of the vehicle around the axis R in the vertical direction, as shown, for example, in FIG. 3, in a two wheel model in which it is assumed that the distance between the wheels of the vehicle is ignored, and the front and rear left and right wheels are respectively collapsed together at the intersection between the longitudinal axis P of the vehicle and each of the wheel axes, at the front wheels WF and the rear wheels WR, the lateral force and the cornering force are approximated to be equal, the cornering force is approximately proportional to the sideslip angles $\beta_f$ and $\beta_r$ of each tire, and furthermore, the vehicle body sideslip angle $\beta$ is approximated to be sufficiently small (for example, sin $\beta=\beta$, cos $\beta=1$), thereby the above equation (2) is derived as an equation of equilibrium for the power of the vehicle lateral direction and the above equation (3) is derived as the equation of equilibrium for the moment of the vehicle around the axis in the vertical direction (the axis R in the vertical direction of the center of gravity).

Furthermore, equation (4) described above is derived as a relative equation of physical quantities that represent the vehicle state (for example, estimated longitudinal acceleration of a vehicle, $G_{ye}$).

Here, in the equations (2) and (3) described above, the physical quantities that can be directly detected are the vehicle speed V, the yaw rate r, and the yaw rate differential value dr/dt (that is, the integrated with respect to time value of the yaw rate r: r'), and the front wheel steering angle $\delta$, and the fixed physical quantities of the vehicle are the total mass m of the vehicle, the distance $L_f$ from the center of gravity of the vehicle to the axle of the front wheel, the distance $L_r$ from the center of gravity of the vehicle to the axle of the rear wheel, and the yawing inertial moment I. When these values and the yawing moment M, which is already known, are treated as constants, equations (2) to (4) described above constitute a three variable simultaneous differential equation comprising the vehicle body sideslip angle $\beta$, the front wheel cornering power $K_f$, and the rear wheel cornering power $K_r$.

That is, each of the cornering powers $K_f$ and $K_r$ that are a proportion of the cornering force with respect to the sideslip $\beta_f$ and $\beta_r$ of each tire must be treated as variables because they change depending on the state of the turning movement of the vehicle and the state of the road surface (for example, a dry asphalt surface, a snow covered surface, or the like).

Thus, each of the detected signals of the yaw rate r of the vehicle detected by the yaw rate sensor 11, the yaw rate differential r' calculated in the yaw rate differential value calculation unit 15, the lateral acceleration $G_y$ detected in the lateral acceleration sensor 12, the vehicle speed V detected in the vehicle speed sensor 13, and the front wheel steering angle $\delta$ detected by the front wheel steering angle sensor 14 are input into the vehicle body sideslip angle estimating apparatus 20.

At this time, the vehicle body sideslip angle estimating apparatus 20 does not calculate the vehicle body sideslip angle $\beta$ by integrating with respect to time the vehicle body sideslip angle differential value d$\beta$/dt (that is, the time differential value of the vehicle body sideslip angle: $\beta'$) of equation (4) described above as one example of the conventional technology. Instead it calculates the vehicle body sideslip angle $\beta$ by integrating with respect to time the vehicle body sideslip angle differential value $\beta'$ of equation (2) described above, as described below.

As shown, for example, in FIG. 4, the vehicle body sideslip angle estimating apparatus 20 comprises the cornering power initial value input unit 41, the sideslip angle differential value computing unit 42, the integrator 43, the longitudinal acceleration estimating unit 44, the subtractor 45, the PID controller 46, and the adder 47.

Depending on the computation processing in the sideslip angle differential value computing device 42 described below, the cornering power initial value input unit 41 supplies a prescribed initial value of either the front wheel cornering power $K_f$ or the rear wheel cornering power $K_r$ (for example, the initial value of the rear wheel cornering power $K_r$ as shown in FIG. 4) to the sideslip angle differential value computing unit 42 via the adder 47.

The sideslip angle differential value computing unit 42 calculates the vehicle body sideslip angle differential value $\beta'$ based on a prescribed initial value of either the front wheel cornering power $K_r$ or the rear wheel cornering power $K_r$ input from the cornering power initial value input unit 41 and the equations (2) and (3) described above.

Here, the sideslip angle differential value computing unit 42, for example, calculates the front wheel cornering power $K_f$ by substituting: the initial value of the rear wheel cornering power $K_r$ input from the cornering power initial value input unit 41; the rear wheel cornering power $K_r$ determined by an adjusted value output from the PID controller 46 described below; the constant vehicle speed V, the yaw rate r, the yaw rate differential value r', the front wheel steering angle $\delta$, the distance $L_f$ from the center of gravity of the vehicle to the front wheel axle, the distance $L_r$ from the center of gravity of the vehicle to the rear wheel axle, the yawing inertial moment I, the yawing moment M; and the vehicle body sideslip angle $\beta$ input from the integrator 43 described below into the following equation (5), whose solution provides the front wheel cornering power $K_f$ in the above equation (3). Moreover, in the first computation, the vehicle body sideslip angle β is zero.

$$K_f = \frac{1}{2\left(\beta + \frac{L_f}{V}r - \delta\right)L_f}\left\{2K_r\left(\beta - \frac{L_r}{V}r\right)L_r + M - Ir'\right\} \quad (5)$$

The sideslip angle differential value computing unit 42, calculates the vehicle body sideslip angle differential value β' by, for example substituting: the front wheel cornering power $K_f$ calculated using equation (5) described above; the determined rear wheel cornering power $K_r$; the constant vehicle speed V, the yaw rate r, the front wheel steering angle δ, the distance $L_f$ from the center of gravity of the vehicle to the front wheel axle, the distance $L_r$ from the center of gravity of the vehicle to the rear wheel axle, and the total mass m of the vehicle; and the vehicle body sideslip angle β input from the integrator 43 described below into the following equation (6), whose solution provides the vehicle body sideslip angle differential value β' in the above equation (2). The vehicle body sideslip angle differential value β' calculated here is input to the integrator 43 and the lateral acceleration estimating unit 44.

$$\beta' = \frac{-2(K_f + K_r)}{mV}\beta + \left\{\frac{-2(K_f L_f - K_r L_r)}{mV^2} - 1\right\}r + \frac{2K_f}{mV}\delta \quad (6)$$

The integrator 43 calculates the vehicle body sideslip angle β by integrating with respect to time the vehicle body sideslip angle differential value β' input from the sideslip angle differential value computing unit 42, and the result is input into the target distributed torque setting apparatus 21 and the sideslip angle differential value computing unit 42. That is, the vehicle body sideslip angle β calculated here is used in the calculation of the front wheel cornering power $K_f$ and the vehicle body sideslip angle differential value β' in the next computation process in the sideslip angle differential value computing unit 42.

The lateral acceleration estimating unit 44 calculates the estimated lateral acceleration of a vehicle $G_{ye}$ by substituting the vehicle body sideslip angle differential value β' input from the sideslip angle differential value computing unit 42, the constant vehicle speed V, and the yaw rate r into equation (4) described above, and inputs the result to the subtractor 45.

The subtractor 45 calculates the deviation between the lateral acceleration $G_y$ input from the lateral acceleration sensor 12 and the estimated lateral acceleration $G_{ye}$ of a vehicle input from the lateral acceleration estimating unit 44, and outputs the result to the PID controller 46.

The PID controller 46 calculates an adjusted value with which the deviation between the lateral acceleration $G_y$ and the estimated lateral acceleration $G_{ye}$ of a vehicle is zero, that is, an adjusted value to adjust a predetermined initial value of either the front wheel cornering power $K_f$ or the rear wheel cornering power $K_r$, output from the cornering power setting unit 41 and input to the sideslip angle differential value computing unit 42, by proportional, integral, differential (PID) calculation, and inputs the result to the adder 47.

That is, if the prescribed initial value of either the front wheel cornering power $K_f$ or the rear wheel cornering power $K_r$, input to the sideslip angle differential value computing unit 42, is an appropriate value, the deviation between the lateral acceleration $G_y$ and the estimated lateral acceleration $G_{ye}$ of a vehicle is zero.

Therefore, for example, in the case where the estimated lateral acceleration $G_{ye}$ is greater than the measured lateral acceleration $G_y$, an adjusted value is set so as to make the front wheel cornering power $K_f$ or the rear wheel cornering power $K_r$, input to the sideslip angle differential value computing unit 42, smaller. On the other hand, in the case where the estimated lateral acceleration $G_{ye}$ is smaller than the measured lateral acceleration $G_y$, for example, an adjusted value is set so as to increase the front wheel cornering power $K_f$ or the rear wheel cornering power $K_r$, input to the sideslip angle differential value computing unit 42.

A vehicle control system 10 according to the present embodiment has the construction described above. Next is a description of the operation of this vehicle control system 10, specifically, a process for estimating the vehicle body sideslip angle β as a quantity that represents the vehicle state.

First, in step S01, the rear wheel cornering power $K_r$ input to the sideslip angle differential value computing unit 42 is calculated using a prescribed initial value of the rear wheel cornering power $K_r$ input from the cornering power setting unit 41, and the adjusted value input from the PID controller 46. In the first computation, the adjusted value is zero.

Next, in step S02, the front wheel cornering power $K_f$ is calculated using equation (5) described above, based on the measured results output from each of the sensors 11, 13 and 14, preset physical amounts, and the like.

Next, in step S03, the vehicle body sideslip angle differential value β' is calculated using equation (6) described above.

In step S04, the vehicle body sideslip angle differential value β' is integrated with respect to time to calculate the vehicle body sideslip angle β, and this vehicle body sideslip angle β is used in the calculation of the front wheel cornering power $K_f$ in step S02, and the calculation of the vehicle body sideslip angle differential value β' in step S03, in the next sequence of computation processing In step S05, the estimated lateral acceleration $G_{ye}$ of the vehicle is calculated using equation (4) described above, based on the vehicle body sideslip angle differential value β', the yaw rate r of the vehicle measured by the yaw rate sensor 11 and the vehicle speed V measured by the vehicle speed sensor 13.

In step S06, the deviation between the lateral acceleration $G_y$ input from the lateral acceleration sensor 12 and the estimated lateral acceleration $G_{ye}$ of the vehicle input from the lateral acceleration estimating 44 is calculated.

In step S07, an adjusted value of a prescribed initial value of the rear wheel cornering power $K_r$, with which the deviation between the lateral acceleration $G_y$ and the estimated lateral acceleration $G_{ye}$ of the vehicle is zero, is set by proportional, integral, differential (PID) calculation.

In step S08, the rear wheel cornering power $K_r$ input to the sideslip angle differential value computing unit 42 is updated using the adjusted value calculated in step S07 and the prescribed initial value of the rear wheel cornering power $K_r$ input from the cornering power initial value input unit 41, the processing returns to step S02, and the processing following step S02 is executed, for example, after a predetermined time interval.

That is, by carrying out the sequence of the processing at a predetermined period based on equations (4) to (6), the deviation between the lateral acceleration $G_y$ and the estimated lateral acceleration $G_{ye}$ of a vehicle tends to converge to a value near zero, so that it is possible to estimate the front wheel cornering power $K_f$, and the rear wheel cornering power $K_r$ as well as the vehicle body sideslip angle β.

This embodiment is not limited to the process flow as shown in FIG. 4, and other methods may also be used. In other words, it is also possible to use a method that calculates the vehicle body sideslip angle β, the front wheel cornering power $K_f$ and the rear wheel cornering power $K_r$, satisfying equations (4) to (6) at the same time.

As described above, according to the method of estimating quantities that represent the vehicle state according to the first embodiment, the vehicle body sideslip angle β is calculated using three unknown quantities of the vehicle body sideslip angle β, the front wheel cornering power $K_f$ and the rear wheel cornering power $K_r$, using the three equations of equation (2), the equation of the equilibrium of forces in the lateral direction of the vehicle, equation (3), the equation of the equilibrium of the moment of the vehicle around the vertical axis, and equation (4), the physical relationship of the quantities that represent the state of the movement of the vehicle. Thus it is possible to estimate the vehicle body sideslip angle β accurately, using a simple method that avoids increasing the computation load.

That is, similar to the example of the conventional technology described above, it is possible to avoid an increase in accumulated errors compared with the case where measurement results including errors are integrated directly, such as the lateral acceleration $G_y$ output from the lateral acceleration sensor, for example.

In addition, it is possible to estimate the front wheel cornering power $K_f$ and the rear wheel cornering power $K_r$ as variables for determining the characteristics of the front wheel and rear wheel tires, accurately in the process of estimating the vehicle body sideslip angle β. For example, in the case where the characteristics of the tires change due to a change in the road surface or the like when traveling, it is possible to prevent the precision of the estimation of the vehicle body sideslip angle β from being reduced.

When calculating the vehicle body sideslip angle differential value β', since recursive calculations are performed by using the vehicle body sideslip angle β calculated in the previous process, it is possible to prevent the vehicle body sideslip angle β obtained by integrating with respect to time the vehicle body sideslip angle differential value β' from diverging.

That is, since the vehicle body sideslip angle β tends to converge by repeating a recursive calculation process, the estimated value of the vehicle body sideslip angle β is prevented from changing significantly, thus it is possible to guarantee the stability of vehicle behavior control.

Moreover, even in the case where the front wheel cornering power $K_f$ or the rear wheel cornering power $K_r$ changes significantly due to a change in the road surface or the like, for example, by setting the front wheel cornering power $K_f$ or the rear wheel cornering power $K_r$ to an adjusted value with which the physical quantity obtained in the process of estimating the vehicle body sideslip angle β, that is, the deviation between the estimated lateral acceleration $G_{ye}$ and the physically measured lateral acceleration $G_y$ is zero, it is possible to calculate an appropriate vehicle body sideslip angle β.

Furthermore, since the estimated lateral acceleration $G_{ye}$ to be compared with the detected lateral acceleration $G_y$ is calculated based on the vehicle body sideslip angle differential value β', it is possible to prevent errors from accumulating in the integration of the variable that is an object of the verification, thus enabling highly accurate verification compared with the case of using the physical quantity calculated based on the vehicle body sideslip angle β obtained by integrating with respect to time the vehicle body sideslip angle differential value β'.

Figure 5:
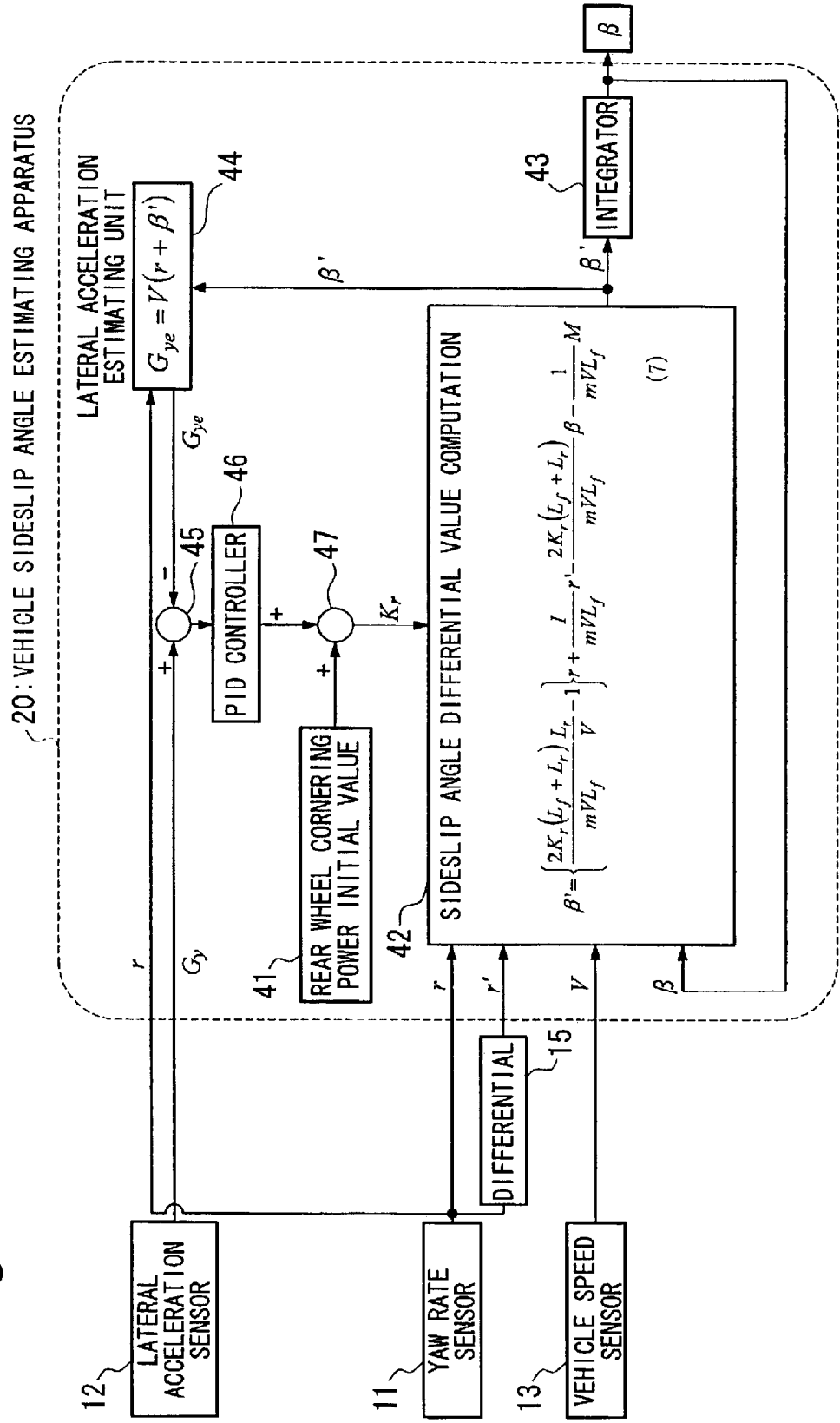
FIG. 5 is a functional block diagram showing the flow of processing according to a first modification of the vehicle body sideslip angle estimating apparatus shown in FIG. 1 and FIG. 2.

Next, the method of estimating the quantities that represent the vehicle state according to a first modification of the embodiment described above will be explained with reference to the attached figures. FIG. 5 is a functional block diagram showing the flow of processing according to a first modification of the vehicle body sideslip angle estimating apparatus 20 shown in FIG. 1 and FIG. 2.

Moreover, below the explanations of the parts that are identical to those of the embodiment described above are abbreviated or omitted.

The major point of difference between this first modification and the first embodiment described above is the content of the computing processing for the sideslip angle differential value computing unit 42. Here, when calculating the vehicle body sideslip angle β, the front wheel steering angle δ is not necessary, and thus the front wheel steering angle sensor 14 can be omitted.

Specifically, the sideslip angle differential value computing unit 42 according to this first modification calculates the vehicle body sideslip angle differential value β' by substituting the initial value of the rear wheel cornering power $K_r$ input from the cornering power initial value input unit 41; the rear wheel cornering power $K_r$ determined by the adjusted value output from the PID controller 46; the constant vehicle speed V, yaw rate r, yaw rate differential value r', the distance $L_f$ from the center of gravity of the vehicle to the front wheel axle, the distance $L_r$ from the center or gravity of the vehicle to the rear wheel axle, the yawing inertial moment I, the yawing moment M, and the total mass of the vehicle; and the vehicle body sideslip angle β input from the integrator 43 into the following equation (7), which is an equation obtained by eliminating the front wheel cornering power $K_f$ from the above equations (2) and (3) and solved to obtain the vehicle body sideslip angle differential value β'.

$$\beta' = \left\{ \frac{2K_r(L_f + L_r)}{mVL_f} \frac{L_r}{V} - 1 \right\} r + \frac{I}{mVL_f} r' - \frac{2K_r(L_f + L_r)}{mVL_f} \beta - \frac{1}{mVL_f} M \quad (7)$$

Thus, in this first modification, in the sequence of processing of step S01 to step S08 in the first embodiment described above, step S02 is omitted, and in step S03, the vehicle body sideslip angle differential value β' is calculated using the above equation (7).

That is, in this first modification, by converging the deviation between the lateral acceleration $G_y$ and the estimated lateral acceleration $G_{ye}$ of the vehicle to a value near zero based on the above equations (4) and (7), it is possible to estimate the vehicle body sideslip angle p and the rear wheel cornering power $K_r$ accurately.

This first modification is not limited to the process flow as shown in FIG. 5, and other methods may also be used. In other words, it is also possible to use a method that calculates the vehicle body sideslip angle β and the rear wheel cornering power $K_r$, satisfying equations (4) and (7) at the same time.

As described above, according to the method of estimating the quantities that represent the vehicle state according to the first modification of the first embodiment, because the front wheel steering angle is unnecessary, it is possible to eliminate the front wheel steering angle sensor 14, and without decreasing the precision of the estimation of the vehicle body sideslip angle β, it is possible to further simplify the structure of the vehicle control system 10 and the computation processing.

Figure 6:
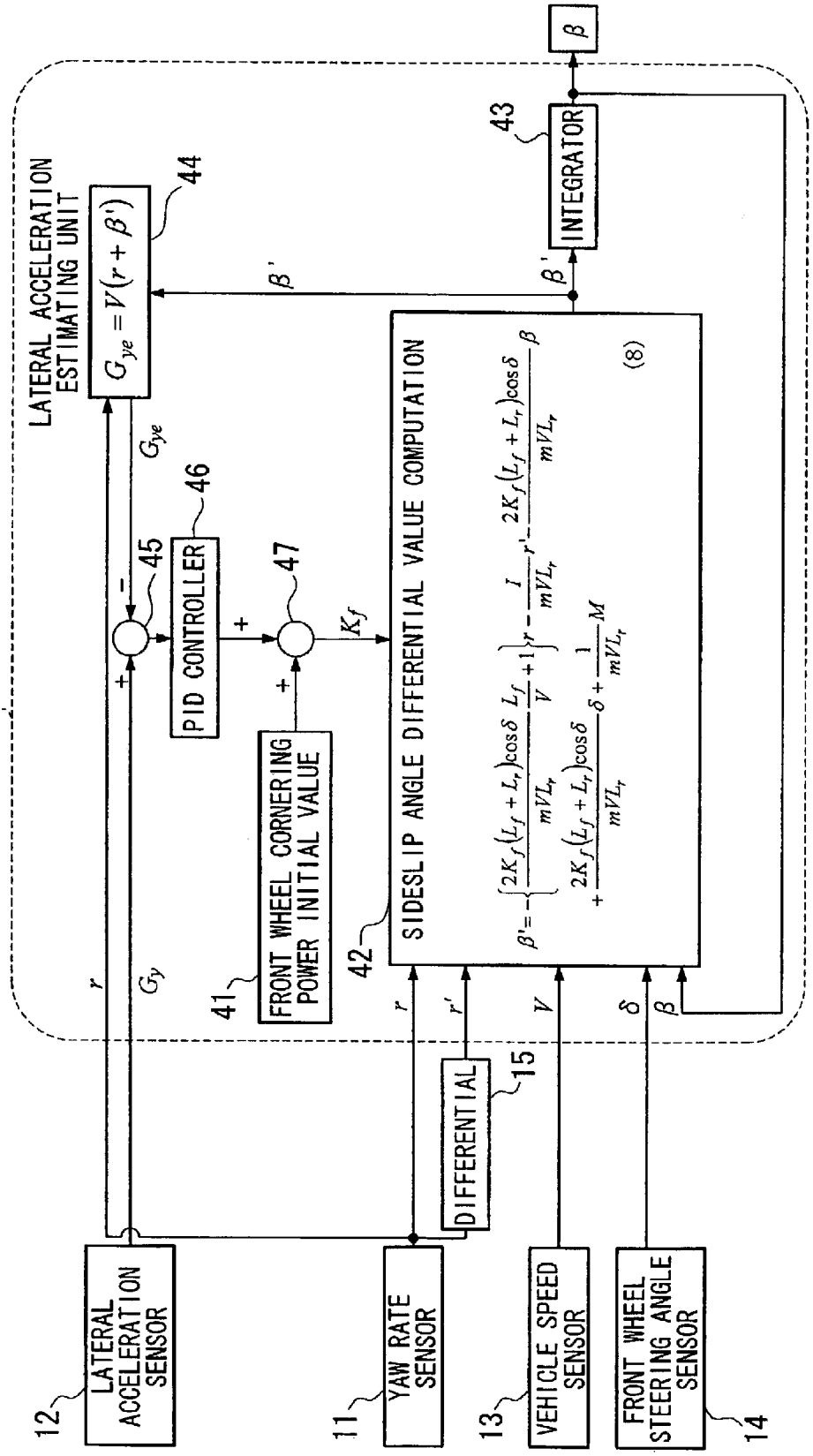
FIG. 6 is a functional block diagram showing the flow of processing according to a second modification of the vehicle body sideslip angle estimating apparatus shown in FIG. 1 and FIG. 2.

Next, the method of estimating the quantities that represent the vehicle state according to a second modification of the first embodiment described above will be explained with reference to the attached figures. FIG. 6 is a functional block diagram showing the flow of processing according to a second modification of the vehicle body sideslip angle estimating apparatus 20 shown in FIG. 1 and FIG. 2.

Moreover, below the explanation of the parts that are identical to those of the embodiment described above are abbreviated or omitted.

In this second modification, the point of difference from the above first embodiment is the content of the computation processing in the sideslip angle differential value computing unit 42, wherein when calculating the vehicle body sideslip angle β here, the vehicle body sideslip angle differential value β' is calculated based on the initial value of the front wheel cornering power $K_f$ input from the cornering power setting unit 41 and the front wheel cornering power $K_f$ determined by the adjusted value output from the PID controller 46, instead of the rear wheel cornering power $K_r$.

Specifically, the sideslip angle differential value computing unit 42 according to this second modification calculates the vehicle body sideslip angle differential value β' by substituting; the determined front wheel cornering power $K_f$; the constant vehicle speed V, yaw rate r, yaw rate differential value r', the distance $L_f$ from the center of gravity of the vehicle to the front wheel axle, the distance $L_r$ from the center or gravity of the vehicle to the rear wheel axle, the yawing inertial moment I, the yawing moment M, and the total mass of the vehicle; and the vehicle body sideslip angle β input from the integrator 43 into the following equation (8), which is an equation obtained by eliminating the rear wheel cornering power $K_r$ from the above equations (2) and (3) and solved to obtain the vehicle body sideslip angle differential value β'.

$$\beta' = -\left\{\frac{2K_f(L_f+L_r)\cos\delta}{mVL_r}\frac{L_f}{V}+1\right\}r - \frac{I}{mVL_r}r' - \frac{2K_f(L_f+L_r)\cos\delta}{mVL_r}\beta + \frac{2K_f(L_f+L_r)\cos\delta}{mVL_r}\delta + \frac{1}{mVL_r}M \quad (8)$$

Therefore, in this second modification, in the sequence of processing of step S01 to step S08 in the first embodiment described above, in step S01, the front wheel cornering power $K_f$ input to the sideslip angle differential value computing unit 42 is calculated using a prescribed initial value of the front wheel cornering power $K_f$ input from the cornering power setting unit 41, and the adjusted value input from the PID controller 46. Furthermore, step S02 is omitted, and in step S03, the vehicle body sideslip angle differential value β' is calculated using the above equation (8).

In addition, in step S07, an adjusted value of a prescribed initial value of the front wheel cornering power $K_f$, with which the deviation between the lateral acceleration $G_y$ and the estimated lateral acceleration $G_{ye}$ of a vehicle is zero, is set by proportional, integral, differential (PID) calculation.

In step S08, the front wheel cornering power $K_f$ input to the sideslip angle differential value computing unit 42 is updated, the processing returns to step S03, and the processing following step S03 is executed, for example, after a predetermined time interval.

That is, in this second modification, it is possible to estimate accurately the front wheel cornering power $K_f$ as well as the vehicle body sideslip angle β by converging the deviation between the lateral acceleration $G_y$ and the estimated lateral acceleration $G_{ye}$ of a vehicle to a value near zero, based on the above equations (4) and (8).

This second modification is not limited to the process flow as shown in FIG. 6, and other methods may also be used. In other words, it is also possible to use a method that calculates the vehicle body sideslip angle β and the front wheel cornering power $K_f$, satisfying equations (4) and (8) at the same time.

Figure 7:
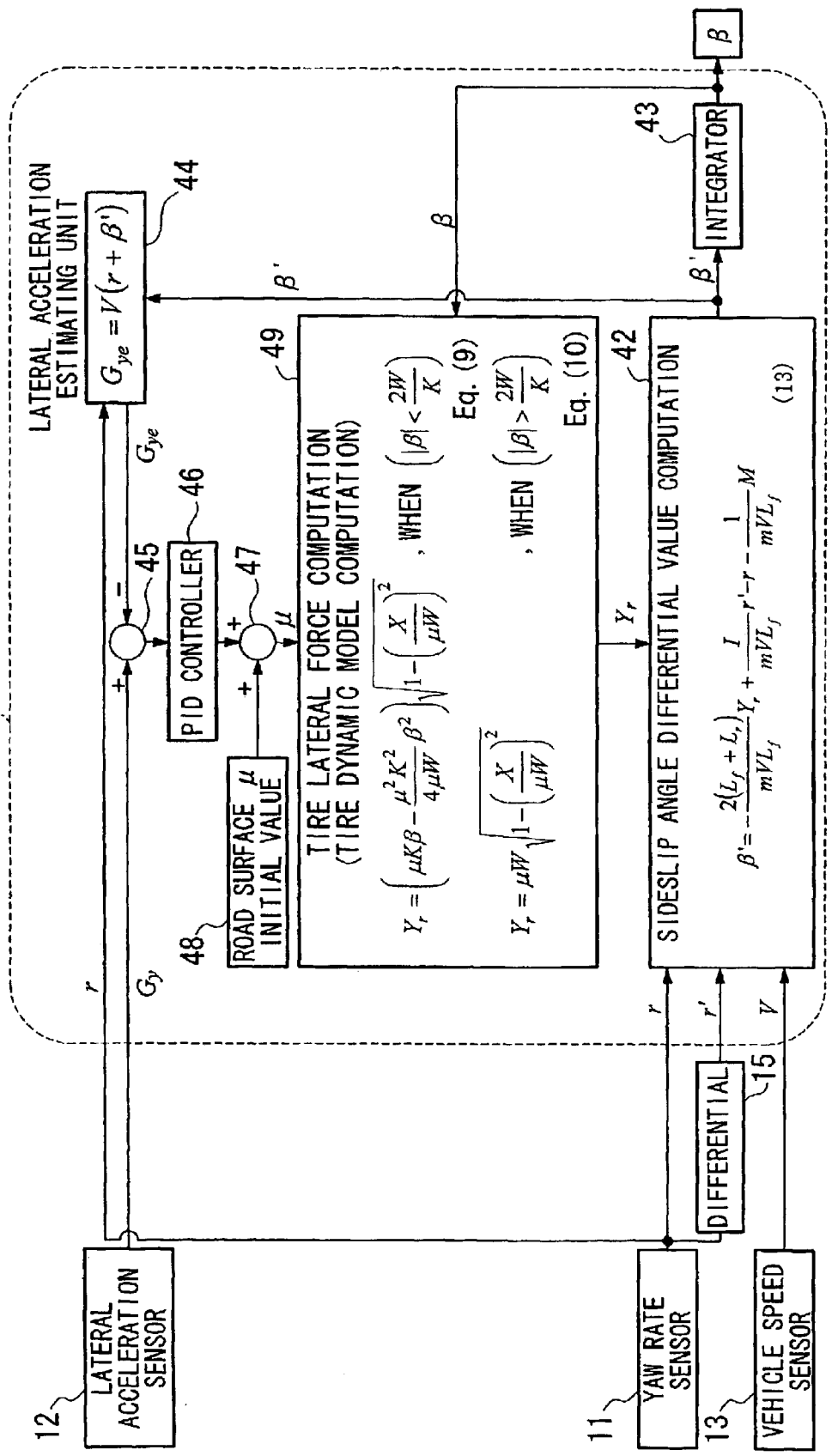
FIG. 7 is a functional block diagram showing the flow of processing according to a third modification of the vehicle body sideslip angle estimating apparatus shown in FIG. 1 and FIG. 2.

Next, a method of estimating the quantities that represent the vehicle state according to a third modification of the first embodiment described above will be explained with reference to the attached figures. FIG. 7 is a functional block diagram showing the flow of processing according to a third modification of the vehicle body sideslip angle estimating apparatus 20 shown in FIG. 1 and FIG. 2.

Moreover, below the explanations of the parts that are identical to those of the embodiment described above are abbreviated or omitted.

In this third modification, the equation of equilibrium for the force in the lateral direction of the vehicle and the equation of equilibrium for the moment of the vehicle around the vertical axis is described based on the lateral force $Y_f$ that acts on the front wheels WF (that is, each of the wheels $W_{FR}$ and $W_{FL}$) and the lateral force $Y_r$ that acts on the rear-wheels (that is, each of the wheels $W_{RR}$ and $W_{RL}$). In addition, the lateral forces $Y_f$ and $Y_r$ are described based on equations related to variables (for example, the coefficient of friction μ between each of the tires and the road surface) that determine the characteristics of the front wheel tires and the rear wheel tires by using a predetermined tire dynamics model as described later.

Specifically, the main point that differs from the first embodiment described above is that the vehicle body sideslip angle differential value β' is calculated, for example, with the coefficient of friction μ between each of the tires and the road surface serving as a variable instead of each of the cornering powers $K_f$ and $K_r$ serving as variables.

In the following, the lateral force $Y_f$ that acts on the front wheels WF (or the front wheel tires) is the average value of the lateral forces that act on the right and left front wheels (wheels $W_{FR}$ and $W_{FL}$), for example, and the lateral force $Y_r$ that acts on the rear wheels WR (or the rear wheel tires) is the average value of the lateral forces that act on the right and left rear wheels (wheels $W_{RR}$ and $W_{RL}$).

The vehicle body sideslip angle estimating apparatus 20 according to this third modification comprises a sideslip angle differential value computing unit 42, an integrator 43, a lateral acceleration estimating unit 44, a subtractor 45, a PID regulator 46, an adder 47, a tire characteristic variable input unit 48, and a tire lateral force computing unit 49. Specifically, instead of the cornering power initial value input unit 41 in the first embodiment described above, the provided tire characteristic variable input unit 48 inputs the initial values of the variables (for example, the coefficient of friction μ between each of the tires and the road surface) that determine the characteristics of the front wheel tires and the rear wheel tires to the adder 47.

On the other hand, the PID controller 46 calculates an adjusted value to adjust the initial value of the coefficient of friction μ, with which the deviation between the lateral acceleration $G_y$ and the estimated lateral acceleration $G_{ye}$ of a vehicle is zero, by proportional, integral, differential (PID) calculation, and inputs the result to the adder 47.

The adder 47 calculates the coefficient of friction μ input to the tire force lateral computing unit 49 using a prescribed initial value of the coefficient of friction μ input from the tire characteristic variable input unit 48 and the adjusted value input from the PID controller 46.

The tire lateral force computing unit 49 calculates the lateral force $Y_r$ applied to the rear wheel tires based on the following equations (9) and (10) derived, for example, from a predetermined tire dynamics model, and outputs the result to the sideslip angle differential value computing unit 42.

$$Y_r = \left(\mu K \beta - \frac{\mu^2 K^2}{4\mu W}\beta^2\right)\sqrt{1-\left(\frac{X}{\mu W}\right)^2}, \left(|\beta| < \frac{2W}{K}\right) \quad (6)$$

$$Y_r = \mu M \sqrt{1-\left(\frac{X}{\mu W}\right)^2}, \left(|\beta| > \frac{2W}{K}\right) \quad (7)$$

Here, in the above equations (9) and (10), the ground load W is a value found from the value that is the measured value of the vehicle load corrected by the longitudinal and lateral acceleration, or the output of the load cell provided on the suspension system, and the cornering power K is the value found from a predetermined map set in advance, comprising, for example, preset and predetermined maps of the cornering power, which change depending on the coefficient of friction $\mu$, the ground load W, or the like. Furthermore, the longitudinal force X is a value estimated from the acceleration (or deceleration) or the like, or, for example, found from the damping hydraulic pressure or the engine output. In addition, the vehicle body sideslip angle $\beta$ is a value input from the integrator 43, and is zero in the first computation. Depending on the value of this vehicle body sideslip angle $\beta$, the lateral force $Y_r$ that is applied to the rear wheel tires is calculated by one of either of the above equations (9) or (10).

The sideslip angle differential value computing unit 42 according to this third modification calculates the vehicle body sideslip angle differential value $\beta'$ by using the following equation (13), in which the equation obtained by eliminating the lateral force $Y_f$ applied, for example, to the front wheels WF, and is solved to obtain the vehicle body sideslip angle differential value $\beta'$, based on the following equations (11) and (12) obtained when representing the equation of equilibrium for the force in the lateral direction of the vehicle and the equation of equilibrium of the moment of the vehicle around the vertical axis based on the lateral force $Y_f$ applied to the front wheel tires and the lateral force $Y_r$ applied to the rear wheel tires.

Specifically, in the following equation (13), the physical quantities that can be directly measured are the vehicle speed V, the yaw rate r, and the yaw rate differential value r', and the fixed physical quantities of the vehicle are the total mass of the vehicle m, the distance $L_f$ from the center of gravity of the vehicle to the front wheel axle, and distance $L_r$ from the center of gravity of the vehicle to the rear wheel axle, and the yawing inertial moment I. These values and the already known yawing moment M are treated as constants, and the vehicle body sideslip angle differential value $\beta'$ is calculated by using the lateral force $Y_r$ input from the tire lateral force computing unit 49.

$$mV(r+\beta')=-2Y_f-2Y_r \quad (11)$$

$$Ir'=-2Y_fL_f+2Y_rL_r+M \quad (12)$$

$$\beta' = -\frac{2(L_f+L_r)}{mVL_f}Y_r + \frac{I}{mVL_f}r' - r - \frac{1}{mVL_f}M \quad (13)$$

Thus, in this third modification, in the sequence of processing of step S01 to step S08 in the first embodiment described above, in step S01, the coefficient of friction $\mu$ input to the tire lateral force computing unit 49 is calculated using the prescribed initial value (for example, a value near 1, or the like) of the coefficient of friction $\mu$ input from the tire characteristic variable input unit 48, and the adjusted value input from the PID controller 46.

Then, in step S02, the lateral force $Y_r$ applied to the rear wheels WR is calculated using the above equations (9) and (10).

Next, in step S02, the vehicle body sideslip angle differential value $\beta'$ is calculated using the above equation (13).

Next, in step S04, the vehicle body sideslip angle $\beta$ is calculated by integrating with respect to time the vehicle body sideslip angle differential value $\beta'$, and this vehicle body sideslip angle $\beta$ is used in the calculation of the lateral force $Y_r$ applied to the rear wheels WR in the above step S02 in the next sequence of processing.

In addition, in step S07, an adjusted value of a prescribed initial value of the coefficient of friction $\mu$, with which the deviation between the lateral acceleration $G_y$ and the estimated lateral acceleration $G_{ye}$ of a vehicle is zero, is set by proportional, integral, differential (PID) calculation.

In step S08, the coefficient of friction $\mu$ input to the tire lateral force computing unit 49 is updated, control returns to step S02, and processing from step S02 is carried out after a prescribed time, for example.

That is, in this third modification, it is possible to estimate accurately the coefficient of friction $\mu$ as well as the vehicle body sideslip angle $\beta$ by converging the deviation between the lateral acceleration $G_y$ and the estimated lateral acceleration $G_{ye}$ of a vehicle to a value near zero, based on the above equations (4) and (13).

This third modification is not limited to the process flow as shown in FIG. 7, and other methods may also be used. In other words, it is also possible to use a method that calculates the vehicle body sideslip angle $\beta$ and the coefficient of friction $\mu$, satisfying equations (4) and (13) at the same time.

Moreover, in this third modification, another tire dynamics model can be used that describes the lateral forces $Y_f$, and $Y_r$ without the ground load W or longitudinal force X serving as variables.

In addition, in the sideslip angle differential value computing unit 42 according to this third modification, similarly to equation (5) of the first embodiment described above, for example, the lateral force $Y_f$ applied to the front wheels WF is calculated by substituting the lateral force $Y_r$ applied to the rear wheel tires based on the above equations (9) and (10) into an equation in which the above equation (12) is solved to obtain the lateral force $Y_r$ applied to the front wheels WF, being the equation of equilibrium for the moment of the vehicle around the vertical axis. Similarly to equation (6) of the first embodiment described above, the vehicle body sideslip angle differential value $\beta'$ may be calculated by substituting each of the lateral forces $Y_r$, and $Y_f$ into the equation, in which the above equation (11), being an equation of equilibrium of the force in the lateral direction of the vehicle, is solved to obtain the vehicle body sideslip angle differential value $\beta'$.

In addition, in this third modification, the lateral force $Y_r$ applied to the rear wheel tires is calculated by the tire lateral force computing unit 49 and the vehicle body sideslip angle differential value $\beta'$ is calculated by the sideslip angle differential value computing unit 42 based on the lateral force $Y_r$ applied to the rear wheel tires. However, this is not limiting. For example, it is possible to calculate by the tire lateral force computing unit 49 the lateral force $Y_f$ applied to the front wheel tires, and then calculate the vehicle body sideslip angle differential value $\beta'$ by an equation obtained by eliminating the lateral force $Y_r$ applied to the rear wheel tires from the above equations (11) and (12), and solved to obtain the vehicle body sideslip angle differential value $\beta'$ by the sideslip angle differential value computing unit 42.

As described above, according to the method of estimating qualities that represent the state of a vehicle according to the third modification of the first embodiment, the variables that determine the characteristics of the front wheel and rear-wheel tires are not limited to the front wheel cornering power $K_f$ and the rear wheel coming power $K_r$, but depending on the control content of the vehicle, for example, it is possible to use appropriate variables such as the coefficient of friction $\mu$ between each of the tires and the road surface, and it is possible to diversify the control equations of the vehicle easily. Furthermore, it is possible to introduce a tire dynamics model according to either one of the rear wheel tires or the front wheel tires, and compared to the case of introducing a tire dynamics model for both the rear wheel tires and the front wheel tires, the deterioration of the precision of the estimation that originate in the modeling can be limited.

Moreover, in the first embodiment and the first to third modifications described above, as shown, for example, in the following equation (14), the vehicle body sideslip angle $\beta$ can be described by the $V_x$ component of the vehicle speed V in the direction of the longitudinal axis P and the $V_y$ component of the perpendicular lateral direction, and furthermore, it is possible to modify the above equations (2) and (3) to the following equations (15) and (16) by making an approximation when the vehicle body sideslip angle $\beta$ is small enough (for example, $V=V_x$). Thereby, as a quantity representing the state of the vehicle, the $V_y$ component of the vehicle speed V in the lateral direction can be estimated instead of the vehicle body lateral sideslip angle $\beta$.

Moreover, in this case, the speed of the rear wheel WR in the two wheel model can be approximated by the $V_x$ component of the vehicle speed V in the direction of the longitudinal axis P.

$$\beta' = a\tan\left(\frac{V_y}{V_x}\right) \qquad \text{Eq. 14}$$

$$m(V_y' + rV_x) = -2K_f\left\{a\tan\left(\frac{V_y + L_f r}{V_x}\right) - \delta\right\} - 2K_r\left\{a\tan\left(\frac{V_y - L_f r}{V_x}\right)\right\} \qquad \text{Eq. 15}$$

$$Ir' = -2K_f\left\{a\tan\left(\frac{V_y + L_f r}{V_x}\right) - \delta\right\}L_f + 2K_r\left\{a\tan\left(\frac{V_y - L_f r}{V_x}\right)\right\}L_r + M \qquad \text{Eq. 16}$$

Figure 8:
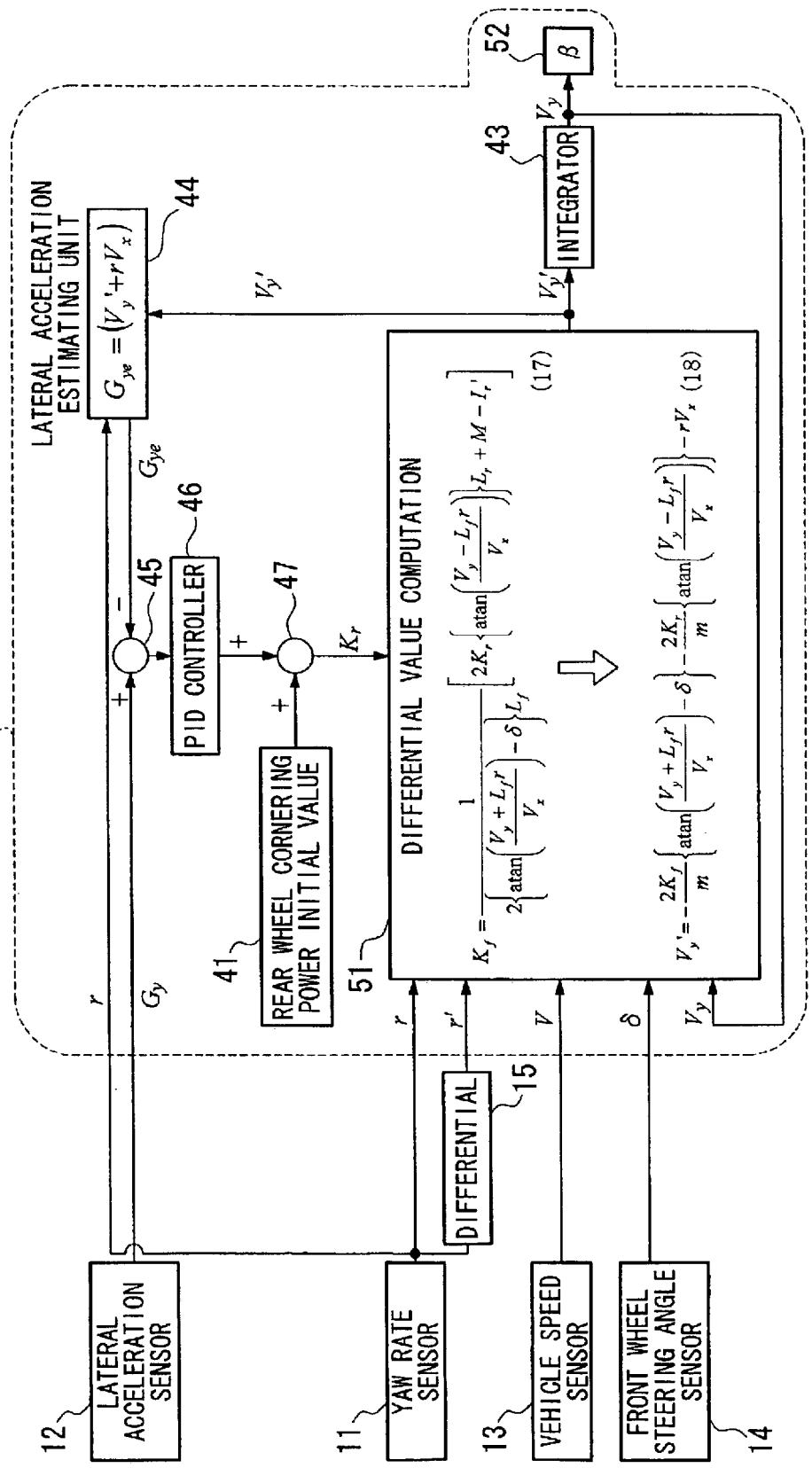
FIG. 8 is a functional block diagram showing the flow of processing according to a fourth modification of the vehicle body sideslip angle estimating apparatus shown in FIG. 1 and FIG. 2.

For example, in the vehicle body sideslip angle estimating apparatus 20 according to a fourth modification of the present embodiment described above, as shown in FIG. 8, a differential value computing unit 51 is provided instead of the sideslip angle differential value computing unit 42, and in this differential value computing unit 51, first the front wheel cornering power $K_f$ is calculated based on the following equation 16, in which the above equation (13) is solved to obtain the front wheel cornering power $K_f$. In addition, the differential value $V_y'$ is estimated based on the following equation 18, in which the above equation 15 is solved to obtain the differential value $dV_y/dt$ (that is, the time differential value of the $V_y$ component in the lateral direction: $V_y'$) of the $V_y$ component of the vehicle speed V in the lateral direction, and the result is input to the integrator 43, and the lateral acceleration estimating unit 44.

$$K_f = \frac{1}{2\left\{a\tan\left(\frac{V_y + L_f r}{V_x}\right) - \delta\right\}L_f}\left[2K_r\left\{a\tan\left(\frac{V_y - L_f r}{V_x}\right)\right\}L_r + M - Ir\right] \qquad (17)$$

$$V_y' = -\frac{2K_f}{m}\left\{a\tan\left(\frac{V_y + L_f r}{V_x}\right) - \delta\right\} - \frac{2K_r}{m}\left\{a\tan\left(\frac{V_y - L_f r}{Vx}\right)\right\} - rV_x \qquad \text{Eq. 18}$$

Here, the integrator 43 calculates the $V_y$ component in the lateral direction by integrating with respect to time the differential value $V_y'$, and at the same time, the $V_y$ component in the lateral direction calculated here is used in the calculation of the differential value $V_y'$ in the next computing processing by the differential value computing unit 51.

In addition, the vehicle body sideslip angle calculating unit 52 provided in the vehicle body sideslip angle estimating apparatus 20 calculates the vehicle body sideslip angle $\beta$ using the above equation (11) based on the $V_y$ component in the lateral direction calculated by the integrator 43.

In addition, the lateral acceleration estimating unit 44 calculates the lateral acceleration $G_{ye}$ of the vehicle by substituting the differential value $V_y'$ input from the differential value computing unit, the $V_y$ component in the longitudinal axis direction of the constant vehicle speed V, and the yaw rate r into the following equation (19), and inputs the result to the subtractor 45.

$$G_{ye} = V(r + \beta') \qquad (19)$$

Thereby, in this fourth modification, in the sequence of processing in step S01 to step S08 in the first embodiment described above, in step S01, the rear wheel cornering power $K_r$ input into the differential value computing unit 51 is calculated. Next, in step S02, the front wheel cornering power $K_f$ is calculated using the above equation (17). Next, in step S03, the differential value $V_y'$ is calculated using the above equation (18).

Next, in step S04, the $V_y$ component in the lateral direction is calculated by integrating with respect to time the differential value $V_y'$, and the $V_y$ component in the lateral direction is used in the calculation of the front wheel cornering power $K_f$ in the above step S02 and the calculation of the differential value $V_y'$ in the above step S03 in the next sequence of computation processing. At the same time, the vehicle body sideslip angle $\beta$ is calculated using the above equation (14).

In step S05, the estimated lateral acceleration $G_{ye}$ of the vehicle is calculated using the above equation (19).

In addition, in step S08, the rear wheel cornering power $K_r$ input to the differential value computing unit 51 is updated using the adjusted value calculated in step S07 and the prescribed initial value of the rear wheel cornering power $K_r$ input from the cornering power initial value input unit 41, the processing returns to step S02, and the processing following step S02 is executed, for example, after a predetermined time interval.

Moreover, in the first embodiment, and the first through fourth modifications described above, the desired yawing moment M was applied to the vehicle by applying the appropriate drive power or braking force to each of the wheels $W_{FR}$, $W_{FL}$, $W_{RR}$, $W_{RL}$, but this is not limiting. For example, the yawing moment M can be omitted.

In addition, in the first embodiment and the first through fourth modifications described above, as shown in FIG. 3, only a vehicle in which the steering angle of the rear wheels WR was zero and only the front vehicle wheels $W_{FR}$ and $W_{FL}$ are steered was the object of the invention, but this is not limiting. For example, a rear wheel steering angle sensor that detects the rear wheel steering angle (that is, the angle between the longitudinal axis P of the vehicle and the longitudinal direction QR of the rear wheels) can be provided, and the vehicle body sideslip angle β can be calculated based on the equation of equilibrium of the force in the lateral direction of the vehicle and the equation of equilibrium of the moment of the vehicle around the vertical axis that include the rear steering angle. In this case, a four wheel steering vehicle can be the object.

In addition, in the first embodiment and the second and fourth modifications, the front wheel steering angle sensor 14 detects the front wheel steering angle δ by dividing the steering angle, which comprises the direction and size of the steering angle input by a driver, by the steering gear ratio of the front wheel steering system, but this is not limiting. For example, the front wheel steering angle δ can be directly detected.

In addition, in the first embodiment and the first to fourth modifications, the PID controller 46 sets the adjusted value such that the deviation between the lateral acceleration $G_y$ and the estimated lateral acceleration $G_{ye}$ of a vehicle, as the quantities that represent the state of the vehicle movement, is zero. However, it is not limited to this, and the adjusted value may be set such that the ratio of the lateral acceleration $G_y$ and the estimated lateral acceleration $G_{ye}$ of the vehicle is "1". In other words, the adjusted value may be set such that the lateral acceleration $G_y$ and the estimated lateral acceleration $G_{ye}$ are equal. Furthermore, instead of comparing the lateral acceleration $G_y$ and the estimated lateral acceleration $G_{ye}$, other quantities that represent the vehicle movement, which satisfy the above equation (4) for example, may be compared.

In addition, in the first embodiment and the first to fourth modifications described above, feedback control is performed such that the deviation between the lateral acceleration $G_y$ and the estimated lateral acceleration $G_{ye}$ of a vehicle is zero by proportional, integral, differential (PID) calculation. However, it is not limited to this. For example, adaptive control or the like, in which the deviation converges to zero, may be performed.

In addition, the arrangement may be, for example, such that by inputting the deviation between the lateral acceleration $G_y$ and the estimated lateral acceleration $G_{ye}$ of a vehicle into a pseudo integrator for pseudo integration, the error is prevented from being accumulated.

Hereunder is a description of a method of estimating quantities that represent the vehicle state according to a second embodiment of the present invention with reference to the appended drawings.

Moreover, below the explanation of the parts that are identical to those of the first embodiment described above are abbreviated or omitted.

Figure 9:
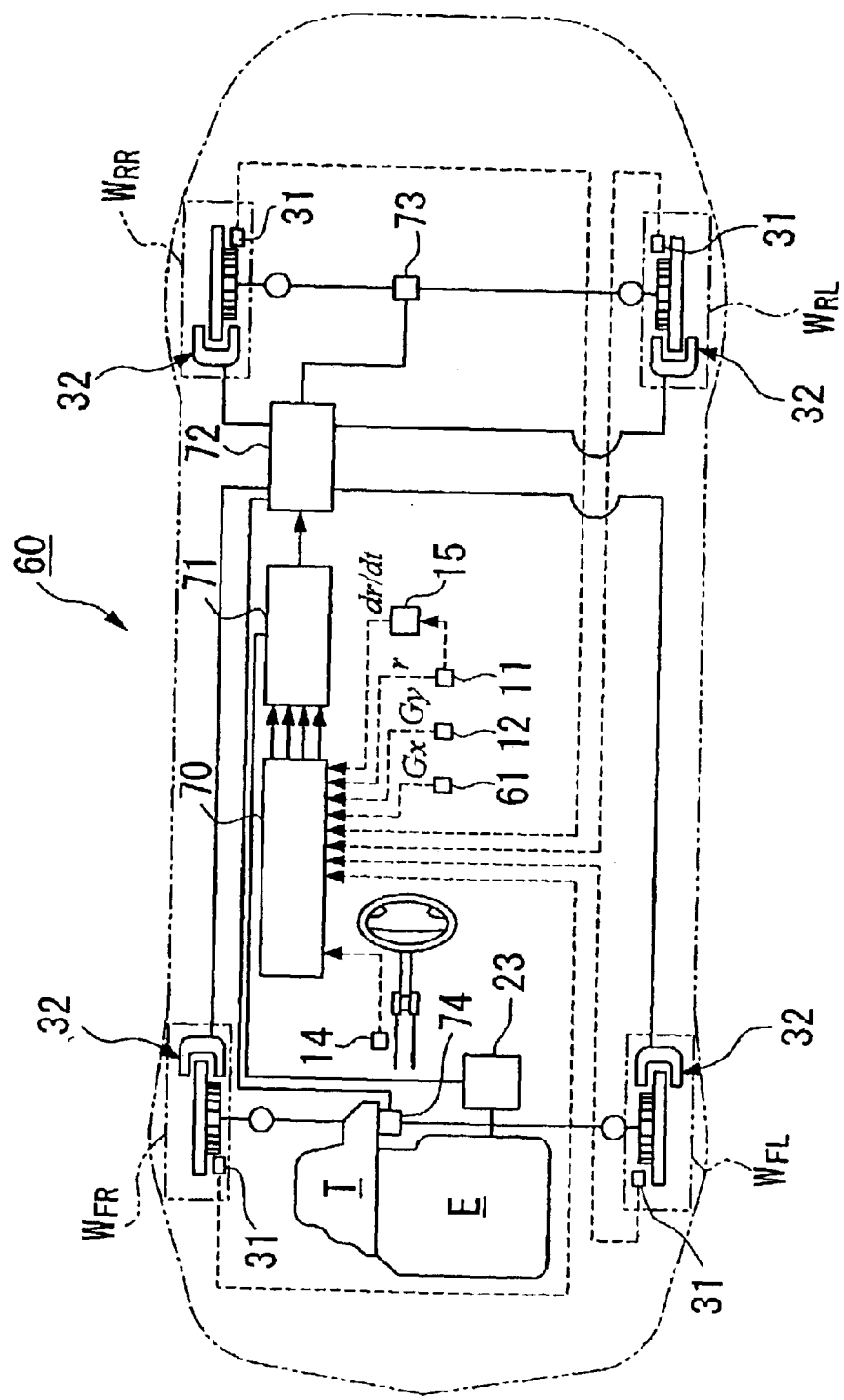
FIG. 9 is a structural diagram of the vehicle control system that realizes the method for estimating the quantities that represent the vehicle state according to a second embodiment of the present invention.
Figure 10:
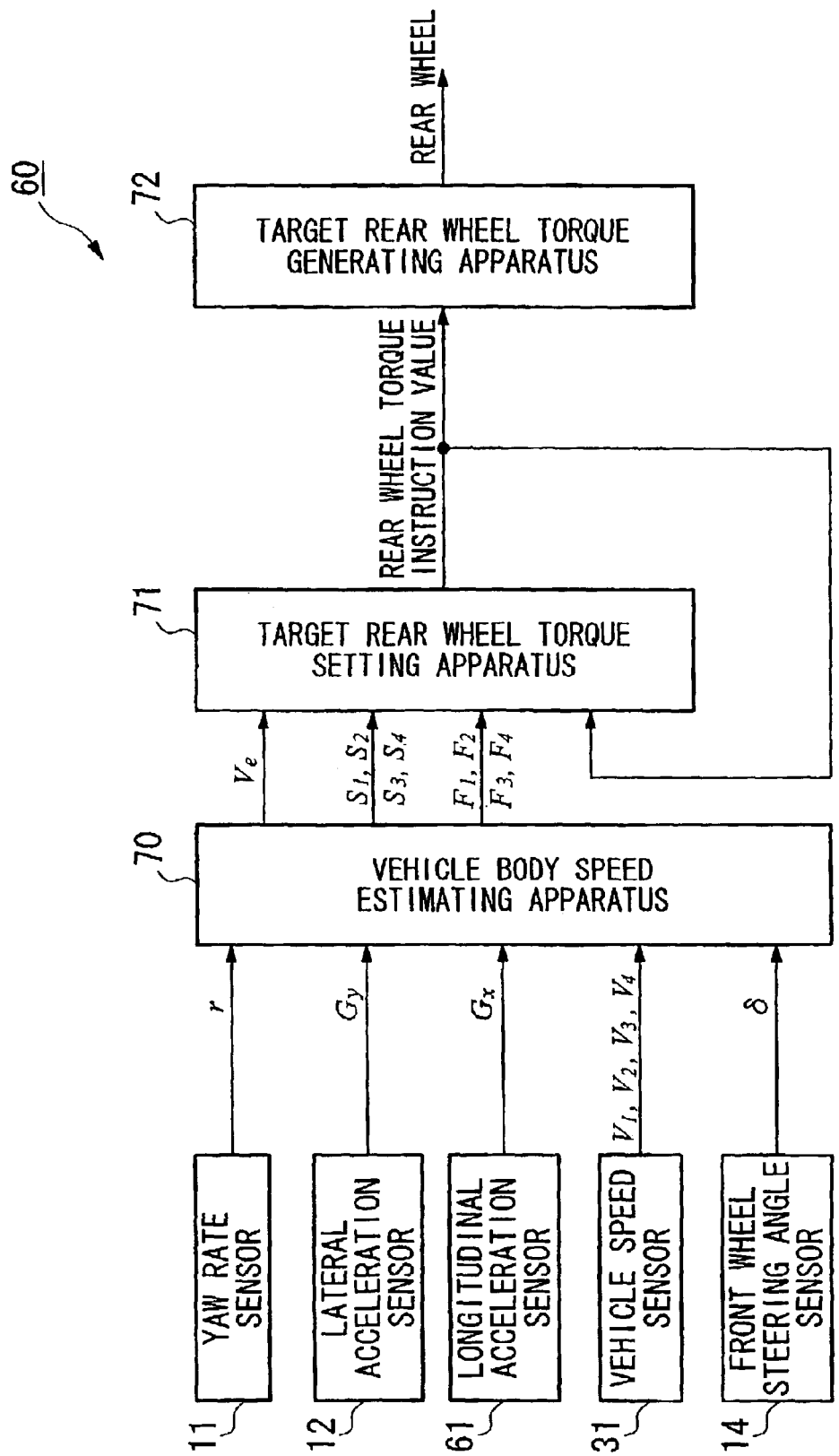
FIG. 10 is a structural diagram of the vehicle control system that realizes the method for estimating the quantities that represent the vehicle state according to the second embodiment of the present invention.
Figure 11:
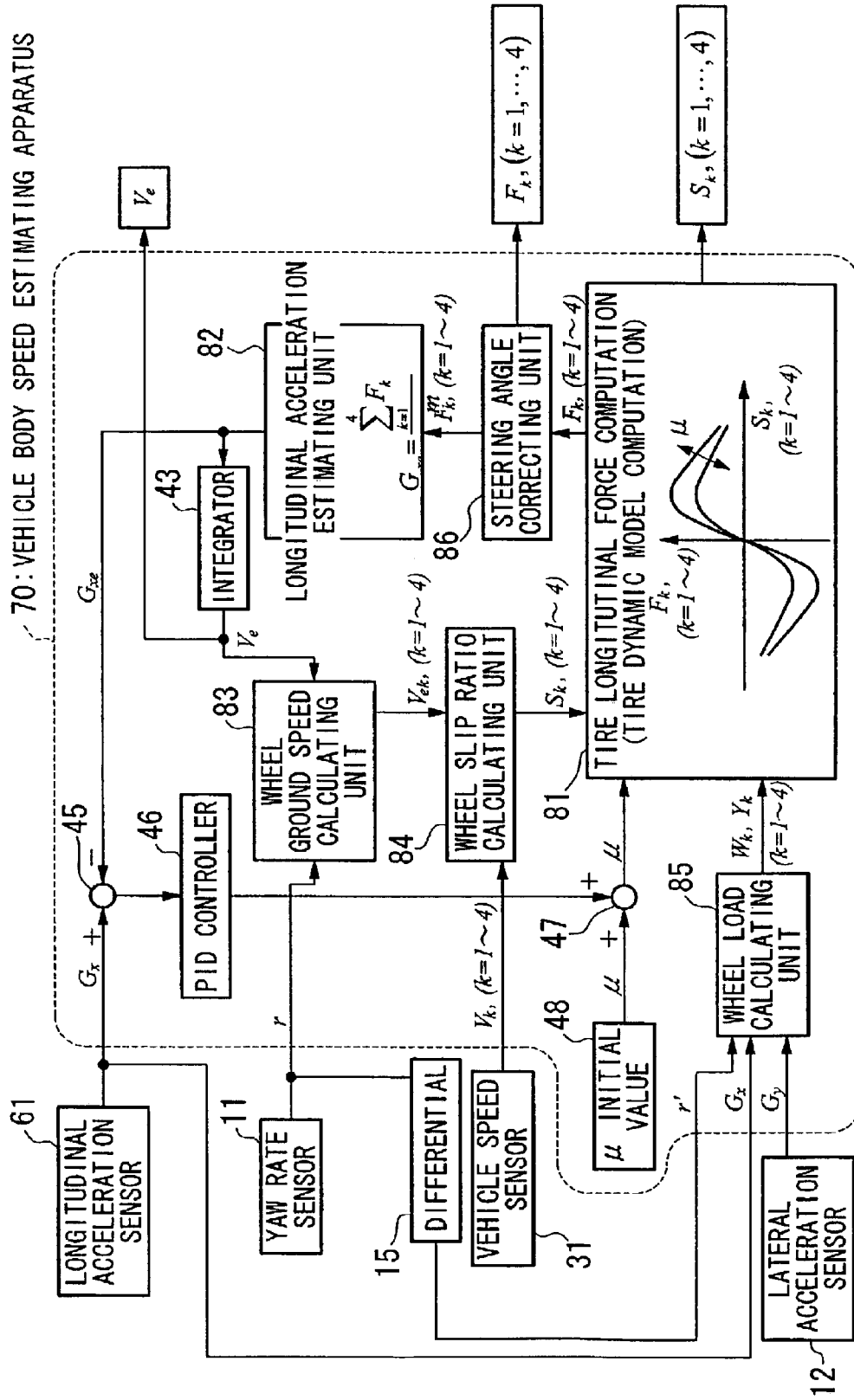
FIG. 11 is a functional block diagram showing an example of the processing flow in the vehicle body speed estimating apparatus shown in FIG. 9 and FIG. 10.
Figure 12:
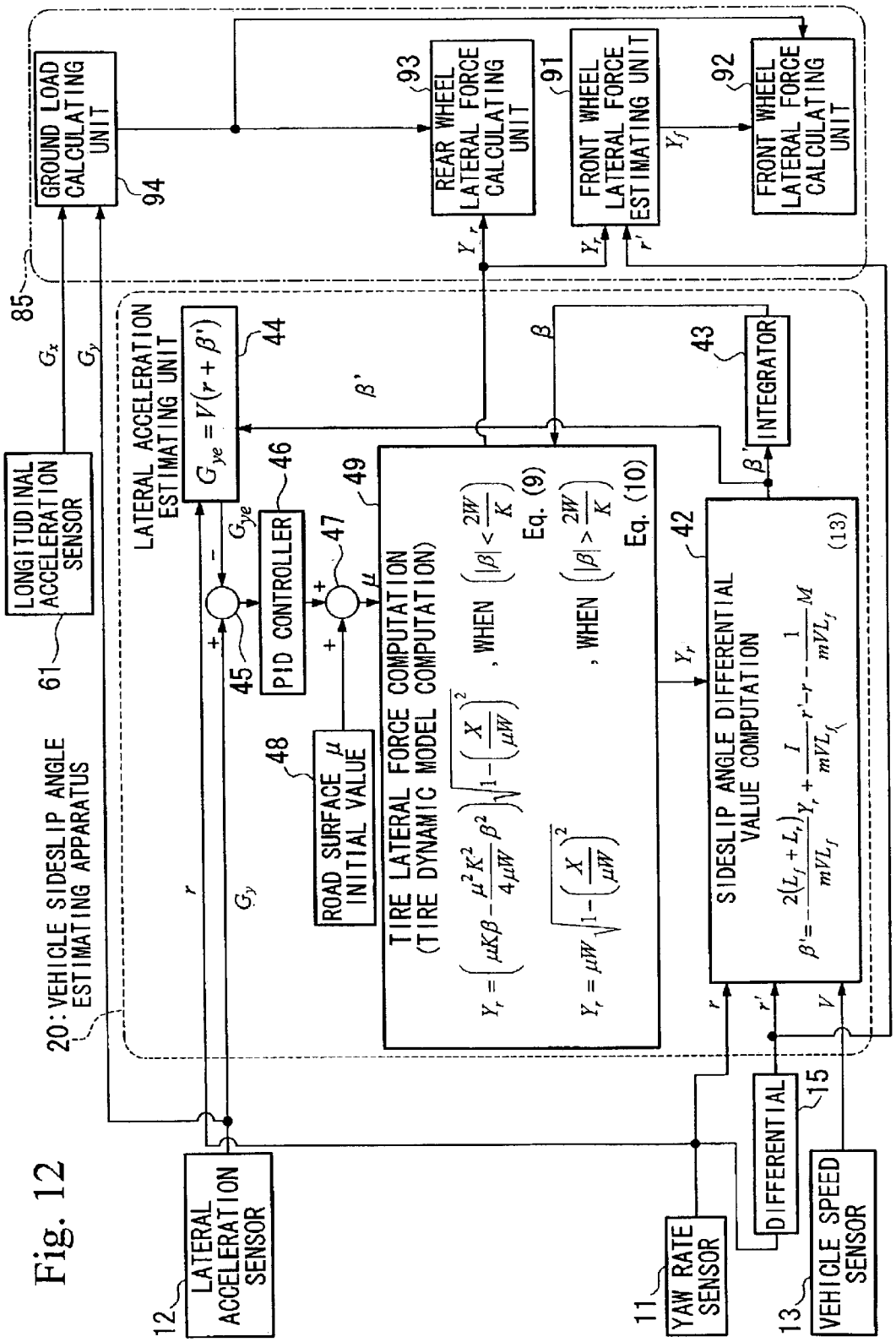
FIG. 12 is a functional block diagram showing an example of the processing flow in each wheel load-calculating unit shown in FIG. 11.
Figure 13:
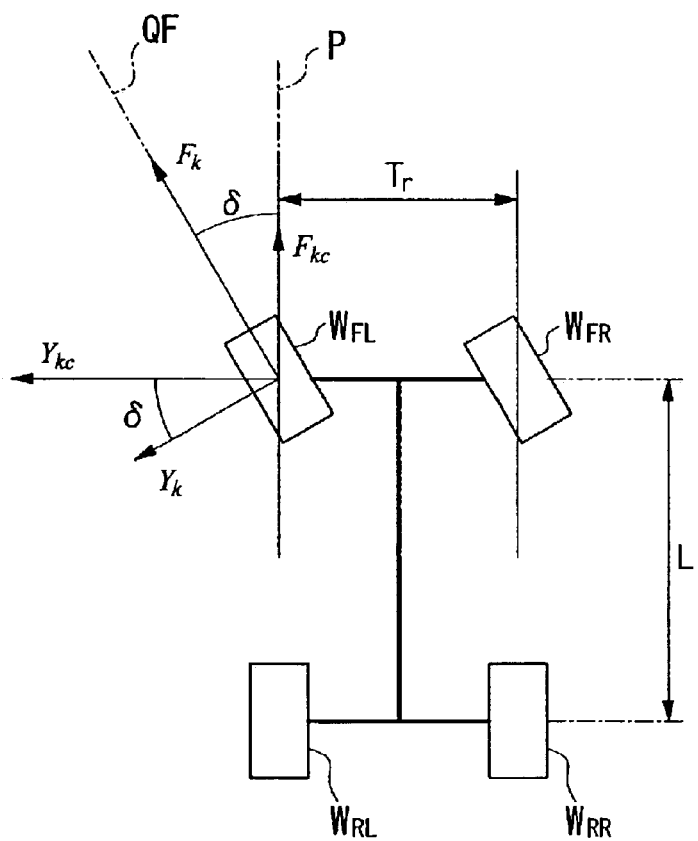
FIG. 13 is a schematic diagram to explain the processing in the steering angle correcting unit shown in FIG. 11.

FIG. 9 and FIG. 10 are structural diagrams of a vehicle control system 60 that realizes the method for estimating the quantities that represent the vehicle state according to a second embodiment of the present invention. FIG. 11 is a structural diagram showing an example of the processing flow in the vehicle body, FIG. 12 is a functional block diagram showing an example of the processing flow in each wheel load calculating unit 85, and FIG. 13 is a schematic diagram to explain the processing in a steering angle correcting unit 86 shown in FIG. 11.

The vehicle control system 60 according to the second embodiment is mounted onto a four wheel drive vehicle for example, which comprises: a yaw rate sensor 11; a yaw rate differential value calculating unit 15; a lateral acceleration sensor 12; a longitudinal acceleration sensor 61; four wheel speed sensors 31 installed in each of the wheels $W_{FR}$, $W_{FL}$, $W_{RR}$ and $W_{RL}$; a front wheel steering angle sensor 14; a vehicle body speed estimating apparatus 70; a target rear wheel torque setting apparatus 71; and a target rear wheel torque generating apparatus 72, as shown in FIG. 9 and FIG. 10.

The yaw rate sensor 11 outputs a signal having a voltage level that depends on the size of the result of detecting the yaw rate r.

The yaw rate differential value calculating unit 15 calculates the yaw rate differential value dr/dt (that is, the time differential value of yaw rate r: r'), and outputs the result to the vehicle body speed estimating apparatus 70.

The lateral acceleration sensor 12 detects the lateral acceleration $G_y$, which is the acceleration (or deceleration) added in the lateral direction of the vehicle, and outputs a signal having a voltage level that depends on the detected result to the vehicle body speed estimating apparatus 70.

The longitudinal acceleration sensor 61 detects the longitudinal acceleration $G_x$, which is the acceleration (or deceleration) added in the longitudinal direction of the vehicle, and outputs a signal having a voltage level that depends on the detected result to the vehicle body speed estimating apparatus 70.

The plurality of wheel sensors 31 detect, for example, the wheel speeds (that is, the turn angle velocities of each of the vehicle's wheels) $V_1$ to $V_4$ of each of the wheels $W_{FR}$, $W_{FL}$, $W_{RR}$ and $W_{RL}$, and output a signal having a voltage level that depends on the detected result to the vehicle body speed estimating apparatus 70.

The front wheel steering angle sensor 14 detects the front wheel steering angle δ (that is, the angle δ formed between the longitudinal axis P of the vehicle and the longitudinal direction QF of the front wheels), and outputs a signal having a voltage level that depends on the detected result to the vehicle body speed estimating apparatus 70.

The vehicle body speed estimating apparatus 70 represents the longitudinal forces $F_1$ to $F_4$ applied to each of the wheels $W_{FR}$, $W_{FL}$, $W_{RR}$ and $W_{EL}$ based on the following equations (20) and (21) regarding variables (for example, the coefficient of friction μ between each of the tires and the road surface) that determine the characteristics of each tire of the wheels $W_{FR}$, $W_{FL}$, $W_{RR}$ and $W_{RL}$, according to a predetermined tire dynamics model. Then, it calculates an estimated value (estimated vehicle speed) $V_e$ as a quantity that represents the vehicle state based on the following equation (22) according to a predetermined equation of motion regarding each of the longitudinal forces $F_1$ to $F_4$, and outputs this estimated vehicle speed $V_e$ to the target rear wheel torque setting apparatus 71. Hereunder, the direction of the estimated vehicle speed $V_e$ is the longitudinal axis direction β of a vehicle, for example.

The target rear wheel torque setting apparatus 71 sets, for example, a rear wheel torque instruction value as a target value of the rear wheel torque of the vehicle based on the estimated vehicle speed $V_e$ estimated in the vehicle body speed estimating apparatus 70, the slip ratios $S_1$ to $S_4$ of each of the wheels $W_{FR}$, $W_{FL}$, $W_{RR}$ and $W_{RL}$, and the longitudinal forces $F_1$ to $F_4$ applied to each of the wheels $W_{FR}$, $W_{FL}$, $W_{RR}$ and $W_{EL}$, and outputs the set rear wheel torque instruction value to the target rear wheel torque generating apparatus 72.

$$F_k = \left(\mu A S_k - \frac{\mu^2 A^2}{4\mu W_k} S_k^2\right)\sqrt{1 - \left(\frac{Y_k}{\mu W_k}\right)^2}, (k = 1, \cdots, 4)\left(|S_k| < \frac{2W_k}{A}\right) \quad (20)$$

$$F_k = \mu W_k \sqrt{1 - \left(\frac{Y_k}{\mu W_k}\right)^2}, (k = 1, \cdots, 4)\left(|S_k| > \frac{2W_k}{A}\right) \quad (21)$$

$$G_{xe} = \frac{1}{m}\sum_{k=1}^{4} F_k \quad (22)$$

The target rear wheel torque generating apparatus 72 applies an appropriate driving force or braking force to the rear wheels WR (for example, each of the wheels $W_{RR}$ and $W_{RL}$) depending on the driving conditions of the vehicle. For example, the target rear wheel torque generating apparatus 72 drives a plurality of braking devices 32 installed in each of the wheels $W_{FR}$, $W_{FL}$, $W_{RR}$ and $W_{RL}$, and drives a rear differential 73 which divides the driving force between the wheels $W_{RR}$ and $W_{RL}$ of the rear wheels WR using for example electronic control or the like, to control the rear wheel torque.

For example, the target rear wheel torque setting apparatus 71 compares the slip ratios of each of the front wheels WF (for example, each of the wheels $W_{FR}$ and $W_{FL}$), and the rear wheels WR (for example, each of the wheels $W_{RR}$ and $W_{RL}$), and sets the target value of the rear wheel torque such that the difference in slip ratio between the front wheels WF and the rear wheels WR is reduced, by reducing the driving force of the wheel with the greater slip ratio.

Here, the target rear wheel torque setting apparatus 71 calculates the estimated value of the rear wheel torque based on the longitudinal forces $F_1$, to $F_4$ applied to each of the wheels $W_{FR}$, $W_{FL}$, $W_{RR}$ and $W_{RL}$, and compares the estimated value of the rear wheel torque calculated and the rear wheel torque instruction value set in the previous processing. Then, it determines a correction value for the rear wheel torque instruction value, which makes the difference between the estimated value of the rear wheel torque and the rear wheel torque instruction value in the previous processing zero, and corrects the rear wheel torque instruction value by this correction value.

As a result, it is possible to correct dispersion in output characteristics due to physical differences of the target rear wheel torque generating apparatus 72, for example age related change, and the like.

The vehicle body speed estimating apparatus 70 does not calculate the estimated vehicle speed $V_e$ by integrating with respect to time the longitudinal acceleration $G_x$ detected by the longitudinal acceleration sensor 61 as in one example of the above conventional technology, for example, but calculates the estimated vehicle speed $V_e$ by integrating with respect to time the estimated longitudinal acceleration $G_{xe}$ of the above equation (22).

Therefore, each of the detected signals of: the yaw rate r of the vehicle detected by the yaw rate sensor 11; the yaw rate differential value r' calculated by the yaw rate differential value calculating unit 15; the lateral acceleration $G_y$ of the vehicle detected by the lateral acceleration sensor 12; the longitudinal acceleration $G_x$ of the vehicle detected by the longitudinal acceleration sensor 61; each of the wheel speeds $V_1$, to $V_4$ detected by the wheel speed sensors 31; and the front wheel steering angle δ detected by the front wheel steering angle sensor 14, is input to the vehicle body speed estimating apparatus 70.

As shown, for example, in FIG. 11, the vehicle body speed estimating apparatus 70 comprises: a tire characteristic variable input unit 48; a tire longitudinal force computing unit 81; a longitudinal acceleration estimating unit 82; a subtractor 45; a PID controller 46; an adder 47; an integrator 43; a wheel ground speed calculating unit 83; a wheel slip ratio calculating unit 84; a wheel load calculating unit 85; and a steering angle correcting unit 86.

The tire characteristic variable input unit 48 supplies the initial values of variables (for example, coefficients of friction μ between each of the tires and the road surface) that determine the characteristics of the tires of each of the wheels $W_{FR}$, $W_{FL}$, $W_{RR}$ and $W_{RL}$ to the longitudinal force computing unit 81 via the adder 47.

The tire longitudinal force computing unit 81 calculates the longitudinal forces $F_1$ to $F_4$ applied to each of the wheels $W_{FR}$, $W_{FL}$, $W_{RR}$ and $W_{RL}$ based on; the coefficient of friction μ from the above input via the adder 47, the slip ratios $S_1$ to $S_4$ of each of the wheels $W_{FR}$, $W_{FL}$, $W_{RR}$ and $W_{RL}$ input from the wheel slip ratio calculating unit 84 as described later, the loads $W_1$ to $W_4$, and the lateral forces $Y_1$ to $Y_4$, of each of the wheels $W_{FR}$, $W_{FL}$, $W_{RR}$ and $W_{RL}$ input from the wheel load calculating unit 85 as described later, and equations (20) and (21).

The tire longitudinal force computing unit 81 inputs the calculated longitudinal forces $F_1$ to $F_4$ of each of the wheels $W_{FR}$, $W_{FL}$, $W_{RR}$ and $W_{RL}$ to the longitudinal acceleration estimating unit 82 via a steering angle correcting unit 86 as described later.

Here, in the above equations (20) and (21), k is a natural number from 1 to 4, and a predetermined constant number A is a coefficient set so as to represent actual tire characteristics. In a simple model, the lateral forces $Y_1$ to $Y_4$ applied to each of the wheels $W_{FR}$, $W_{FL}$, $W_{RR}$ and $W_{RL}$ may be set to zero.

The longitudinal acceleration estimating unit 82 calculates the estimated longitudinal acceleration $G_{xe}$ of the vehicle by substituting the longitudinal forces $F_1$ to $F_4$ of each of wheels $W_{FR}$, $W_{FL}$, $W_{RR}$ and $W_{RL}$ input from the tire longitudinal force computing unit 81 via the steering angle correcting unit 86, and the total mass m of the vehicle, being the fixed physical quantity of the vehicle, into the above equation (22), and inputs the result to the subtractor 45 and the integrator 43.

The subtractor 45 calculates the deviation between the longitudinal acceleration $G_x$ input from the longitudinal acceleration sensor 61 and the estimated longitudinal acceleration $G_{xe}$ of the vehicle input from the longitudinal acceleration estimating unit 82, and outputs the result to the PID controller 46.

The PID controller 46 calculates an adjusted value with which the deviation between the longitudinal acceleration $G_x$ and the estimated longitudinal acceleration $G_{xe}$ of a vehicle is zero, that is, an adjusted value to adjust a predetermined initial value of the coefficient of friction μ, output from the tire characteristic variable input unit 48, by proportional, integral, differential (PID) calculation, and inputs the result to the adder 47.

Here, if the coefficient of friction μ input to the tire longitudinal force computing unit 81 is an appropriate value, the deviation between the longitudinal acceleration $G_x$ and the estimated longitudinal acceleration $G_{xe}$ of the vehicle is zero.

Therefore, for example, in the case where the estimated longitudinal acceleration $G_{xe}$ of the vehicle is greater than the measured longitudinal acceleration $G_x$, an adjusted value of the coefficient of friction μ is set so as to reduce the longitudinal forces $F_1$ to $F_4$ calculated by the tire longitudinal force computing unit 81. On the other hand, in the case where the estimated longitudinal acceleration $G_{xe}$ is smaller than the measured longitudinal acceleration $G_x$ for example, an adjusted value of the coefficient of friction $\mu$ is set so as to increase the longitudinal forces $F_1$ to $F_4$.

In addition, the integrator 43 integrates with respect to time the estimated longitudinal acceleration $G_{xe}$ input from the longitudinal acceleration estimating unit 82, and calculates the estimated vehicle speed $V_e$. Then, it outputs the calculated estimated vehicle speed $V_e$ to the target rear wheel torque setting apparatus 71 and the wheel ground speed calculating unit 83.

The wheel ground speed calculating unit 83 substitutes the estimated vehicle speed $V_e$ input from the integrator 43, the vehicle yaw rate r detected by the yaw rate sensor 11, and the tread Tr, being the fixed physical quantities of the vehicle, into the following equation (23), calculates the ground speeds $V_{e1}$ to $V_{e4}$ (ground speed) of each of the wheels $W_{FR}$, $W_{FL}$, $W_{RR}$ and $W_{RL}$, and inputs the result to the wheel slip ratio calculating unit 84.

In the following equation (23), for example, in the case where the normal direction of the yaw rate r is set to counterclockwise, the negative symbol is selected for the left side wheels (for example, the wheels $W_{FL}$ and $W_{RL}$), and the positive symbol is selected for the right side wheels (for example, the wheels $W_{FR}$ and $W_{RR}$).

In addition, the wheel ground speed calculating unit 83 sets an appropriate initial value as the estimated vehicle speed $V_e$ in the first pass calculation when no output is generated from the integrator 43, and calculates each of the ground speeds $V_{e1}$ to $V_{e4}$.

$$V_{ek} = V_e \pm \frac{T_r}{2} r \quad (k = 1, \cdots, 4) \tag{23}$$

The wheel slip ratio calculating unit 84 substitutes the ground speeds $V_{e1}$ to $V_{e4}$ of each of the wheels $W_{FR}$, $W_{FL}$, $W_{RR}$ and $W_{RL}$ input from the ground speed calculating unit 83, and the wheel speeds $V_1$ to $V_4$ of each of the wheels $W_{FR}$, $W_{FL}$, $W_{RR}$ and $W_{RL}$ input from the wheel speed sensors 31 to 31 into the following equation (24), calculates the slip ratios $S_1$ to $S_4$ of each of the wheels $W_{FR}$, $W_{FL}$, $W_{RR}$ and $W_{RL}$, and inputs the results to the tire longitudinal force computing unit 81.

$$S_k = \frac{V_{ek} - V_k}{V_{ek}} \quad (k = 1, \cdots, 4) \tag{24}$$

In addition, the wheel load calculating unit 85, which calculates the loads $W_1$ to $W_4$ of each of the wheels $W_{FR}$, $W_{FL}$, $W_{RR}$ and $W_{RL}$, and the lateral forces $Y_1$ to $Y_4$, and inputs the result to the tire longitudinal force computing unit 81, comprises a front wheel lateral force estimating unit 91, a front wheel lateral force calculating unit 92, a rear wheel lateral force calculating unit 93 and a ground load calculating unit 94, as shown in FIG. 12.

Here, the lateral force $Y_r$ of the rear wheel tires, calculated by the vehicle body sideslip angle estimating apparatus 20 according to the third modification of the first embodiment described above is input to the front wheel lateral force estimating unit 91 and the rear wheel lateral force calculating unit 93.

That is, in the tire lateral force computing unit 49 of the vehicle body sideslip angle estimating apparatus 20, the lateral force $Y_r$ of the rear wheel tires, calculated based on the above equations (9) and (10) derived from a predetermined tire dynamics model, for example, is input to the sideslip angle differential value computing unit 42 of the vehicle body sideslip angle estimating apparatus 20, the front wheel lateral force estimating unit 91 and the rear wheel lateral force calculating unit 93.

The front wheel lateral force estimating unit 91 calculates the lateral force $Y_f$ applied to the front wheel tires using the following equation (25) obtained when the equation of equilibrium of the moment of the vehicle around the vertical axis is described based on the lateral force $Y_f$ applied to the front wheel tires and lateral force $Y_r$ applied to the rear wheel tires.

That is, in the following equation (25), the physical quantity that can be detected directly is the yaw rate differential value r', and the fixed physical quantities of the vehicle are the distance $L_f$ from the center of gravity of the vehicle to the front wheel axle, the distance $L_r$ from the center of gravity of the vehicle to the rear wheel axle, and the yawing inertial moment I. The lateral force $Y_f$ applied to the front wheel tires is calculated by using the lateral force $Y_r$ of the rear wheel tires, input from the tire lateral force computing unit 49 of the vehicle body sideslip angle estimating apparatus 20 according to the third modification of the first embodiment described above.

$$Y_f = \frac{1}{2L_f}(-Ir' + 2Y_r L_r + M) \tag{25}$$

The front wheel lateral force calculating unit 92 substitutes the inside front wheel load $W_{Fin}$ (that is, the load applied to the front wheel on the inside when the vehicle turns) and the outside front wheel load $W_{Fout}$ (that is, the load applied to the front wheel on the outside when the vehicle turns), input from the ground load calculating unit 94 as described later, and the lateral force $Y_f$ of the front wheel tires, input from the front wheel lateral force estimating unit 91, into the following equations (26) and (27), and calculates the lateral force of the inside front wheel tire $Y_{fin}$, and the lateral force of the outside front wheel tire $Y_{fout}$. Then, the lateral force of the inside front wheel tire $Y_{fin}$, and the lateral force of the outside front wheel tire $Y_{fout}$ are associated with one or other of the lateral forces $Y_1$ and $Y_2$ of the wheels $W_{FR}$ and $W_{FL}$.

$$Y_{fin} = 2Y_f \cdot \frac{W_{Fin}}{W_{Fin} + W_{Fout}} \tag{26}$$

$$Y_{fout} = 2Y_f \cdot \frac{W_{Fout}}{W_{Fin} + W_{Fout}} \tag{27}$$

The rear wheel lateral force calculating unit 93 substitutes the inside rear wheel load $W_{Rin}$ (that is, the load applied to the rear wheel on the inside when the vehicle turns), the outside rear wheel load $W_{Rout}$ (that is, the load applied to the rear wheel on the outside when the vehicle turns), input from the ground load calculating unit 94 as described later, and the lateral force $Y_r$ of the rear wheel tires, input from the tire lateral force computing unit 49 of the vehicle body sideslip angle estimating apparatus 20 according to the third modification of the first embodiment described above, into the following equations (28) and (29), and calculates the lateral force of the inside rear wheel tire $Y_{rin}$, and the lateral force of the outside rear wheel tire $Y_{rout}$. Then, the lateral force of the inside rear wheel tire $Y_{rin}$, and the lateral force of the outside rear wheel tire $Y_{rout}$ are associated with one or other of the lateral forces $Y_3$ and $Y_4$ of the wheels $W_{RR}$ and $W_{RL}$.

$$Y_{rin} = 2Y_r \cdot \frac{W_{Rin}}{W_{Rin} + W_{Rout}} \qquad (28)$$

$$Y_{rout} = 2Y_r \cdot \frac{W_{Rout}}{W_{Rin} + W_{Rout}} \qquad (29)$$

The ground load calculating unit 94 calculates the load moving quantity in the longitudinal direction (longitudinal load moving quantity) $dW_x$, the load moving quantity of the front wheels WF in the left-right direction (front wheel left-right load moving quantity) $dW_{yF}$, and the load moving quantity of the rear wheels WR in the left-right direction (rear wheel left-right load moving quantity) $dW_{yR}$, based on the following equations (30), (31) and (32).

Here, in the following equations (30) to (32), the physical quantities that can be detected directly are the longitudinal acceleration $G_x$ and the lateral acceleration $G_y$, and the fixed physical quantities of the vehicle are the total mass m of the vehicle, the height hg of the center of gravity of the vehicle in the vertical direction, the wheelbase L, the front roll stiffness Gf, the rear roll stiffness Gr and the tread Tr.

$$dW_x = \frac{mh_g}{L} G_x \qquad (30)$$

$$dW_{yF} = \frac{G_f}{G_f + G_r} \cdot \frac{mh_g}{T_r} G_y \qquad (31)$$

$$dW_{yR} = \frac{G_r}{G_f + G_r} \cdot \frac{mh_g}{T_r} G_y \qquad (32)$$

Furthermore, the ground load calculating unit 94 calculates the inside front wheel load $W_{Fin}$, the outside front wheel load $W_{Rout}$, the inside rear wheel load $W_{Rin}$ and the outside rear wheel load $W_{Rout}$, based on the calculated longitudinal load moving quantity $dW_x$, front wheel left-right load moving quantity $dW_{yF}$ and rear wheel left-right load moving quantity $dW_{yR}$, and the following equations (33) to (36).

Here, in the following equations (33) to (36), the fixed physical quantities of the vehicle are the load $W_f$ on the front wheel axle and the load Wr on the rear wheel axle when the vehicle is stopped.

$$W_{Fin} = \frac{W_f - dW_x}{2} - dW_{yF} \qquad (33)$$

$$W_{Fout} = \frac{W_f - dW_x}{2} + dW_{yF} \qquad (34)$$

$$W_{Rin} = \frac{W_r - dW_x}{2} - dW_{yR} \qquad (35)$$

$$W_{Rout} = \frac{W_r - dW_x}{2} + dW_{yR} \qquad (36)$$

In addition, the steering angle correcting section 86 corrects the steering angle (that is, the angle between the longitudinal axis P of the vehicle and the longitudinal direction of the front wheels or the rear wheels) based on the longitudinal forces $F_1$ to $F_4$, and the lateral forces $Y_1$ to $Y_4$ of each of the wheels $W_{FR}$, $W_{FL}$, $W_{RR}$ and $W_{RL}$, output from the tire longitudinal force computing unit 81.

As shown in FIG. 13, for example, in the case where the correction is performed for the front wheel steering angle $\delta$ (that is, the angle between the longitudinal axis P of the vehicle and the longitudinal direction QF of the front wheels), the steering angle correcting unit 86 calculates the longitudinal forces $F_{1C}$ and $F_{2C}$, and the lateral forces $Y_{1C}$ and $Y_{2C}$ of each of the wheels $W_{FR}$ and $W_{FL}$ after correcting the steering angle, using the following equation (37), and outputs the longitudinal forces $F_{1C}$ and $F_{2C}$, and the lateral forces $Y_{1C}$ and $Y_{2C}$, as new longitudinal forces $F_1$ and $F_2$, and lateral forces $Y_1$ and $Y_2$ of each of the wheels $W_{FR}$ and $W_{FL}$.

$$\begin{pmatrix} F_{kc} \\ Y_{kc} \end{pmatrix} = \begin{pmatrix} \cos\delta & -\sin\delta \\ \sin\delta & \cos\delta \end{pmatrix} \begin{pmatrix} F_k \\ Y_k \end{pmatrix}, \quad (k = 1, 2) \qquad (37)$$

The vehicle control system 60 according to the present embodiment is provided with the above construction. Next is a description of the operation of the vehicle control system 60, specifically, the processing for estimating vehicle speed as a quantity that represents the state of the vehicle.

First, in step S11, a predetermined initial value (for example, a value close to 1) of the coefficient of friction $\mu$ is input from the tire characteristic variable input unit 48 to the tire longitudinal force computing unit 81 via the adder 47. In this first computation the adjusted value, which is input from the PID controller 47 to the adder 47, is zero. Furthermore, in the wheel ground speed calculating unit 83, the estimated vehicle speed $V_e$ is set to an appropriate initial value.

Next, in step S12, the ground speeds $V_{e1}$ to $V_{e4}$ of each of the wheels $W_{FR}$, $W_{FL}$, $W_{RR}$ and $W_{RL}$ are calculated based on the detected result output from the yaw rate sensor 11, the fixed physical quantities of the vehicle and the estimated vehicle speed $V_e$, using the above equation (23).

Next, in step S13, the slip ratios $S_1$ to $S_4$ of each of the wheels $W_{FR}$, $W_{FL}$, $W_{RR}$ and $W_{RL}$ are calculated based on the wheel speeds V1 to V4 and the ground speeds $V_{e1}$ to $V_{e4}$, of each of the wheels $W_{FR}$, $W_{FL}$, $W_{RR}$ and $W_{RL}$, input from the wheel speed sensors 31 to 31, using the above equation (24).

Then, in step S14, the loads $W_1$ to $W_4$ applied to each of the wheels $W_{FR}$, $W_{FL}$, $W_{RR}$ and $W_{RL}$ are calculated based on the detected values output from each of the acceleration sensors 12 and 61.

In step S15, the longitudinal forces $F_1$ to $F_4$ applied to each of the wheels $W_{FR}$, $W_{FL}$, $W_{RR}$ and $W_{RL}$ are calculated based on the coefficient of friction $\mu$, the slip ratios $S_1$ to $S_4$ and the loads $W_1$ to $W_4$ of each of the wheels $W_{FR}$, $W_{FL}$, $W_{RR}$ and $W_{RL}$, using the above equations (20) and (21).

In step S16, the estimated longitudinal acceleration $G_{xe}$ is calculated based on the longitudinal forces $F_1$ to $F_4$ of each of the wheels $W_{FR}$, $W_{FL}$, $W_{RR}$ and $W_{RL}$, and the total mass m of the vehicle, being the fixed physical quantities of the vehicle, using the above equation (22).

In step S17, the deviation between the longitudinal acceleration $G_x$ input from the longitudinal acceleration sensor 61 and the estimated longitudinal acceleration $G_{xe}$ of the vehicle, input from the longitudinal acceleration estimating unit 82 is calculated.

Then, in step S18, an adjusted value of a predetermined initial value of the coefficient of friction $\mu$, with which the deviation between the longitudinal acceleration $G_x$ and the estimated longitudinal acceleration $G_{xe}$ of the vehicle is zero, is determined, by proportional, integral, differential (PID) calculation.

In step S19, the estimated longitudinal acceleration $G_{xe}$ of the vehicle is integrated with respect to time, and the estimated vehicle speed $V_e$ is calculated.

In step S20, the coefficient of friction $\mu$ to be input to the tire longitudinal force computing unit 81 is updated by the adjusted value calculated in step S18, and the predetermined initial value of the coefficient of friction $\mu$ input from the tire characteristic variable input unit 48, and at the same time, the calculated estimated vehicle speed $V_e$ is input to the wheel ground speed calculating unit 83, the processing returns to step S12, and the processing following step S12 is executed, for example, after a predetermined time interval.

Furthermore, in step S20, the rear wheel torque of the vehicle is controlled based on the estimated vehicle speed $V_e$, the slip ratios $S_1$ to $S_4$ and the longitudinal forces $F_1$ to $F_4$, of each of the wheels $W_{FR}$, $W_{FL}$, $W_{RR}$ and $W_{RL}$.

As described above, according to the method of estimating quantities that represent the vehicle state according to the second embodiment, in the case where the sideslip angles $\beta_f$ and $\beta_r$ of each of the tires, the slip ratios $S_1$ to $S_4$ of each of the wheels $W_{FR}$, $W_{FL}$, $W_{RR}$ and $W_{RL}$, and the like are increased, for example, it is possible to estimate the vehicle speed accurately.

As a result, in the case where the travel control of the vehicle is performed based on the estimated vehicle speed $V_e$, for example, it is possible to control it appropriately and stably. Furthermore, it is possible to detect, for example, an excessive increase of the sideslip angles $\beta_f$ and $\beta_r$ of each of the tires, the slip ratios $S_1$ to $S_4$ of each of the wheels $W_{FR}$, $W_{FL}$, $W_{RR}$ and $W_{RL}$, and the like, instantly, thus enabling the travel safety of the vehicle to be improved.

In addition, in the process of calculating the estimated vehicle speed $V_e$, it is possible to estimate the coefficient of friction $\mu$ as a variable to determine the longitudinal forces $F_1$ to $F_4$ of each of the wheels $W_{FR}$, $W_{FL}$, $W_{RR}$ and $W_{RL}$, and the characteristics of the front and rear wheel tires. Thus it is possible to prevent the precision of the estimation of the estimated vehicle speed $V_e$ from being reduced, even in the case where the characteristics of the tires are changed due to a change in the road surface or the like, when traveling for example.

Here, when calculating the estimated longitudinal acceleration $G_{xe}$, since recursive calculations are performed by using the estimated vehicle speed $V_e$ calculated in the previous processing, it is possible to prevent the estimated vehicle speed $V_e$ obtained by integrating with respect to time the estimated longitudinal acceleration $G_{xe}$ from diverging.

That is, since the estimated vehicle speed $V_e$ tends to converge by repeating a recursive calculation process, the estimated value of the vehicle speed $V_e$ is prevented from changing significantly. Thus it is possible to guarantee the stability of the vehicle behavior control.

Furthermore, even in the case where the coefficient of friction $\mu$, being a variable to determine the characteristics of the front and rear wheel tires, changes significantly due to a change in the road surface or the like, for example, by setting the coefficient of friction $\mu$ to an adjusted value with which the measured longitudinal acceleration $G_x$ is zero, it is possible to calculate an appropriate estimated vehicle speed $V_e$.

Moreover, by comparing the longitudinal acceleration $G_x$ and the longitudinal acceleration $G_{xe}$, when calculating the estimated vehicle speed $V_e$, it is possible to prevent errors from accumulating in the integration of the variable that is an object of the verification, compared with the case where the verification is performed by using the estimated vehicle speed $V_e$ obtained by integrating with respect to time the estimated longitudinal acceleration $G_{xe}$, for example, thus enabling highly accurate verification.

In the second embodiment described above, the PID controller 46 determines an adjusted value such that the deviation between the longitudinal acceleration $G_x$ and the estimated longitudinal acceleration $G_{xe}$ of the vehicle, being the quantity that represents the vehicle movement, is zero. However, it is not limited to this, and the adjusted value may be determined such that the ratio of the longitudinal acceleration $G_x$ and the estimated longitudinal acceleration $G_{xe}$ of the vehicle is one, for example. In other words, the adjusted value may be determined such that the longitudinal acceleration $G_x$ and the estimated longitudinal acceleration $G_{xe}$ are equal.

In addition, in the second embodiment, feedback control is performed such that the deviation between the longitudinal acceleration $G_x$ and the estimated longitudinal acceleration $G_{xe}$ of the vehicle converges to zero by proportional, integral, differential (PID) calculation. However, it is not limited to this, and adaptive control or the like, in which the deviation converges zero, may be performed, for example.

In addition, the arrangement may be such that the deviation between the longitudinal acceleration $G_x$ and the estimated longitudinal acceleration $G_{xe}$ of the vehicle is input to a pseudo-integrator, for example, and pseudo-integration is performed in respect to the conditions of the rocking motion of the vehicle, or the like, thus preventing errors from accumulating.

In addition, in the second embodiment, the rear wheel torque of the vehicle is controlled based on the estimated vehicle speed $V_e$ estimated by the vehicle body speed estimating apparatus 70, the slip ratios $S_1$ to $S_4$ and the longitudinal forces $F_1$ to $F_4$ of each of the wheels $W_{FR}$, $W_{FL}$, $W_{RR}$ and $W_{RL}$. However, it is not limited to this, and the front wheel torque may be controlled. In this case, a front differential 74 or the like in which the driving force is divided between the wheels $W_{FR}$, $W_{FL}$ of the front wheels WF by electronic control or the like may be used.

Figure 15:
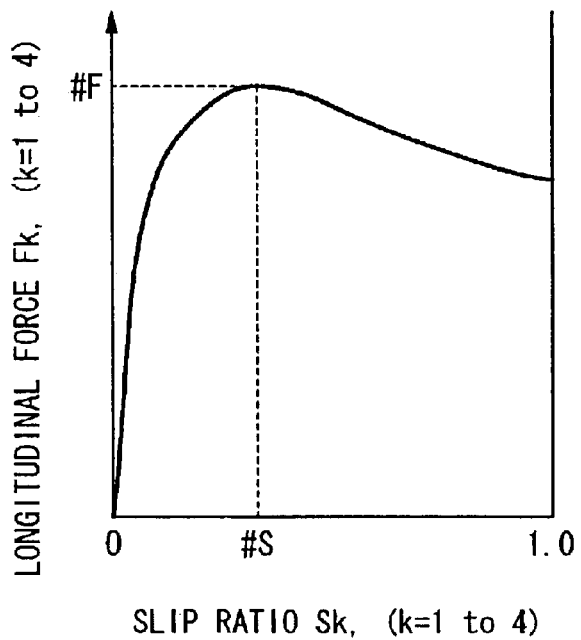
FIG. 15 is a graph showing the relationship between the slip ratios $S_1$ to $S_4$ and the longitudinal forces $F_1$ to $F_4$ of each of the wheels $W_{FR}$, $W_{FL}$, $W_{RR}$ and $W_{RL}$.

Next is a description of a method of estimating the quantities that represent the vehicle state according to a first modification of the second embodiment described above with reference to the attached figures. FIG. 14 is a functional block diagram showing the flow of processing according to the first modification of the vehicle control system 60 shown in FIG. 10. FIG. 15 is a graph showing the relationship between the slip ratios $S_1$ to $S_4$ and the longitudinal forces $F_1$ to $F_4$ of each of the wheels $W_{FR}$, $W_{FL}$, $W_{RR}$ and $W_{RL}$.

Moreover, below, the explanation of the parts that are identical to those of the embodiment described above are abbreviated or omitted.

The major point of difference between this first modification and the second embodiment described above is that a target braking force control apparatus 95 and a target braking force generating apparatus 96 are provided instead of the target rear wheel torque setting apparatus 71 and the target rear wheel torque generating apparatus 72.

Accordingly, in step S20, the braking force of the vehicle is controlled based on the estimated vehicle speed $V_e$, the slip ratios $S_1$ to $S_4$ and the longitudinal forces $F_1$ to $F_4$ of each of the wheels $W_{FR}$, $W_{FL}$, $W_{RR}$ and $W_{RL}$.

That is, the target braking force control apparatus 95 determines braking force instruction values for each wheel, for example, as target values of the braking forces of each of the wheels $W_{FR}$, $W_{FL}$, $W_{RR}$ and $W_{RL}$, based on the estimated vehicle speed $V_e$ estimated by the vehicle body speed estimating apparatus 70, the slip ratios $S_1$ to $S_4$ and the longitudinal forces $F_1$ to $F_4$ of each.of the wheels $W_{FR}$, $W_{FL}$, $W_{RR}$ and $W_{RL}$, and the determined braking force instruction values for each wheel are output to the target braking force generating apparatus 96.

The target braking force generating apparatus 96, for example, drives a plurality of brake devices 32, or the like, installed in each of the wheels $W_{FR}$, $W_{FL}$, $W_{RR}$ and $W_{RL}$, and controls the braking forces of each of the wheels $W_{FR}$, $W_{FL}$, $W_{RR}$ and $W_{RL}$.

For example, the target braking force control apparatus 95 determines whether the slip ratios $S_1$ to $S_4$ of each of the wheels $W_{FR}$, $W_{FL}$, $W_{RR}$ and $W_{RL}$ exceed predetermined slip ratios or not, and in the case where the determined result is "yes", reduces the target value of the braking force of the corresponding wheel. Similarly, in the case where the longitudinal force (that is, braking force) of the corresponding wheel is reduced, the target value of the corresponding wheel is increased. By repeating such a process, as shown in FIG. 15 for example, the slip ratios $S_1$ to $S_4$ of each of the wheels $W_{FR}$, $W_{FL}$, $W_{RR}$ and $W_{RL}$ can be converged to a value near a predetermined slip ratio #S with which the longitudinal forces $F_1$ to $F_4$ applied to each of the wheels $W_{FR}$, $W_{FL}$, $W_{RR}$ and $W_{RL}$ are a maximum value #F. This prevents the slip ratios $S_1$ to $S_4$ of each of the wheels $W_{FR}$, $W_{FL}$, $W_{RR}$ and $W_{RL}$ from increasing excessively, even in the case of controlling the braking operation of the vehicle, for example, so that it is possible to guarantee a required braking force, and shorten the distance required for braking.

Furthermore, the target braking force control apparatus 95 calculates the estimated value of the braking force based on the longitudinal forces $F_1$ to $F_4$ applied to each of the wheels $W_{FR}$, $W_{FL}$, $W_{RR}$ and $W_{RL}$, and compares the calculated estimated value of the braking force and the braking force instruction value for each wheel set in the previous processing. Then, a correction value is set for the braking force instruction value for each wheel, with which the difference between the estimated value of the braking force and the braking force instruction value for each wheel in the previous processing is zero, and the braking force instruction value for each wheel is corrected by this correction value.

This enables dispersion of output characteristics due to physical differences of the target braking force generating apparatus 96, age related changes, and the like, for example, to be corrected.

Figure 16:
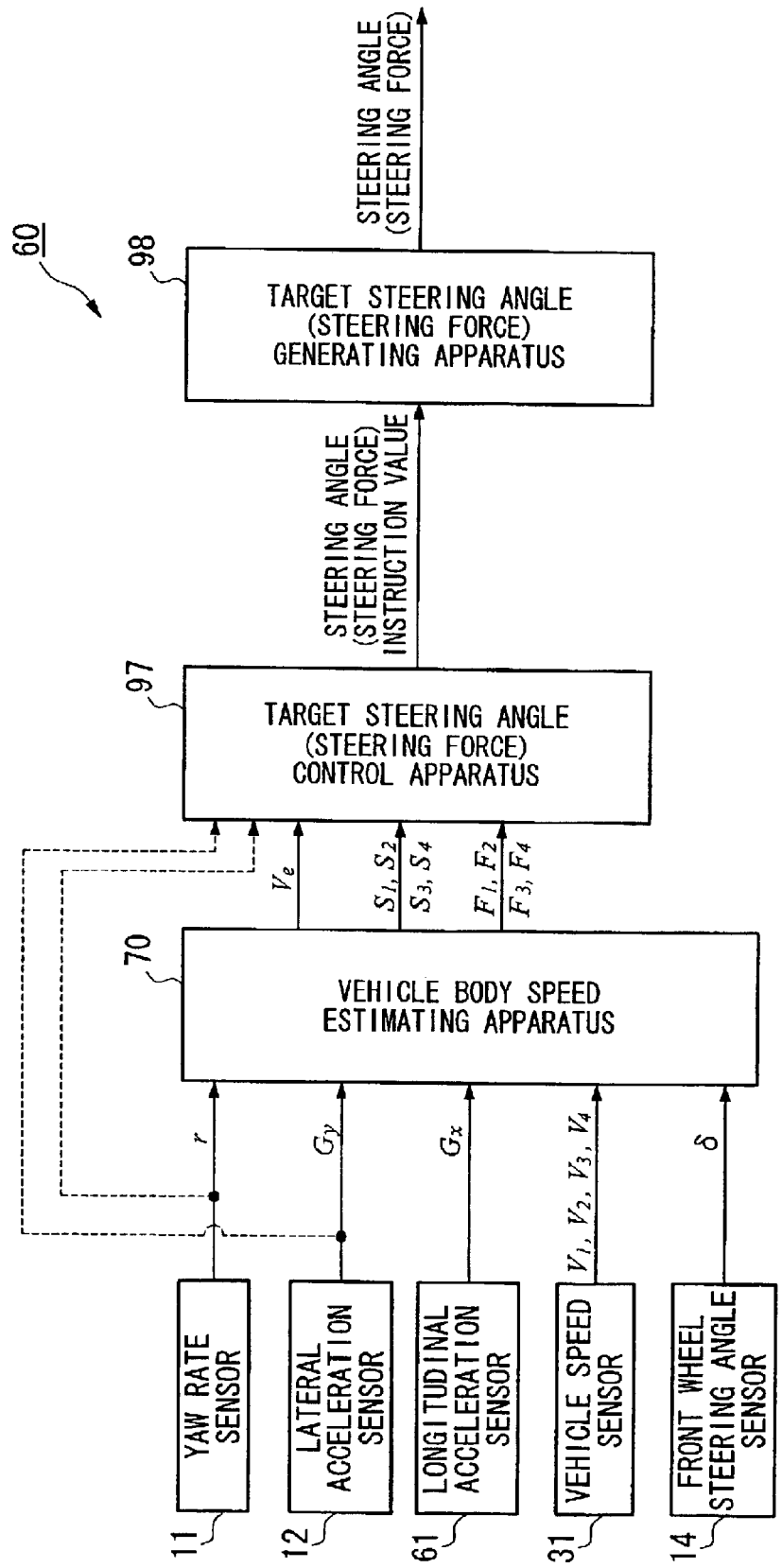
FIG. 16 is a functional block diagram showing the processing flow of a second modification of the vehicle control system according to the second embodiment of the present invention shown in FIG. 10.

Next is a description of the method of estimating the quantities that represent the vehicle state according to a second modification of the second embodiment described above with reference to the attached figures. FIG. 16 is a functional block diagram showing the flow of processing according to the second modification of the vehicle control system 60 shown in FIG. 10.

Hereunder, the explanation of the parts that are identical to those of the embodiment described above are abbreviated or omitted.

The major point of difference between this second modification and the second embodiment described above is that a target steering angle control apparatus 97 and a target steering angle generating apparatus 98 are provided instead of the target rear wheel torque setting apparatus 71 and the target rear wheel torque generating apparatus 72.

Accordingly, in step S20, the steering angles of the front wheels WF and the rear wheels WR are controlled based on the estimated vehicle speed $V_e$, the slip ratios $S_1$ to $S_4$ and the longitudinal forces $F_1$ to $F_4$ of each of the wheels $W_{FR}$, $W_{FL}$, $W_{RR}$ and $W_{RL}$.

That is, the target steering angle control apparatus 97 sets steering angle instruction values as target values of the steering angles of the front wheels WF and the rear wheels WR in order to realize the required travel behavior and the like, described by a predetermined friction circle, for example, based on the estimated vehicle speed $V_e$ estimated by the vehicle body speed estimating apparatus 70, the slip ratios $S_1$ to $S_4$ of each of the wheels $W_{FR}$, $W_{FL}$, $W_{RR}$ and $W_{RL}$, the longitudinal forces $F_1$ to $F_4$ acting on each of the wheels $W_{FR}$, $W_{FL}$, $W_{RR}$ and $W_{RL}$, and detected values output from the yaw rate sensor 11, the lateral acceleration sensor 12 and the like, and outputs the result to the target steering angle generating apparatus 98.

The target steering angle generating apparatus 98 drives a variable steering angle ratio steering apparatus which varies a steering angle ratio, being the steering angle of the steered wheels with respect to the steering angle of the steering wheel, in response to the vehicle speed or the like, for example, and a steering control apparatus which controls the steering angle electronically in response to the steering of a driver, or the like, and controls the steering angles of the front wheels WF and the rear wheels WR.

As a result, even in the case where the sideslip angles $\beta_f$ and $\beta_r$ of each of the tires, the slip ratios $S_1$ to $S_4$ of each of the wheels $W_{FR}$, $W_{FL}$, $W_{RR}$ and $W_{RL}$, and the like increase excessively, it is possible to prevent the precision of the estimation of the estimated vehicle speed $V_e$ from being reduced, and also to control the steering angle, being a control amount, in response to the estimated vehicle speed $V_e$, appropriately and stably.

Moreover, in this second modification, instead of the target steering angle control apparatus 97 and the target steering angle generating apparatus 98, a target steering force control apparatus 97 and a target steering force generating apparatus 98 may be provided, for example, and an electric power steering apparatus or the like, for example, which assists the driver's steering in response to the vehicle speed or the like, may be used, and the steering forces of the front wheels WF and the rear wheels WR may be controlled instead of the steering angles of the front wheels WF and the rear wheels WR.

As explained above, according to the first aspect of the method of estimating the quantities that represent the state of a vehicle of the present invention, it is possible to improve the precision of calculated required quantities that represent the vehicle state or values related to the required quantities that represent the vehicle state, by repeated correction of the initial values substituted into a movement equation based on verification by measurable quantities that represent the vehicle state.

In addition, according to the second aspect of the method of estimating the quantities that represent the vehicle state of the present invention, since verification is performed based on the differential values of the required quantities that represent the vehicle state or the differential values of the values related to the required quantities that represent the vehicle state, compared with the case where verification is performed based on values obtained by integrating these differential values, for example, it is possible to prevent errors from being accumulated by integration computation, thus enabling accurate verification.

Furthermore, by repeated recursive calculation processing using the required quantities that represent the vehicle state or values related to the required quantities that represent the vehicle state, which are calculated in the previous processing, the calculated results are prevented from changing significantly, so that it is possible to guarantee stable control of the vehicle travel behavior based on those values.

Moreover, according to the third aspect of the method of estimating the quantities that represent the vehicle state of the present invention, by repeatedly correcting the initial values substituted into the movement equation, even in the case where a characteristic value related to tire characteristics changes significantly due to a change in the road surface for example, it is possible to improve the accuracy of the calculated required quantities that represent the vehicle state or the values related to the required quantities that represent the vehicle state.

Furthermore, according to the fourth aspect of the method of estimating the quantities that represent the vehicle state of the present invention, when controlling the travel behavior of the vehicle, a required driving force or braking force can be guaranteed, and at the same time it is possible to correct dispersion in output characteristics due to physical differences in a driving force generating unit or a braking force generating unit for example, age related changes, and the like.

Moreover, according to the fifth aspect of the method of estimating the quantities that represent the vehicle state of the present invention, even in the case where the travel behavior of a vehicle changes according to the steering angle of the front wheels and the rear wheels, required travel behavior can be guaranteed, and at the same time, it is possible to generate a steering force to assist the driver's steering appropriately according to the travel behavior of the vehicle, for example Furthermore, according to the sixth aspect of the method of estimating the quantities that represent the vehicle state of the present invention, by repeatedly correcting the initial value to be substituted into the movement equation, even in the case where a characteristic value related to tire characteristics changes significantly due to a change in the road surface or the like for example, it is possible to improve the accuracy of the calculated vehicle body sideslip angle, or differential values of the vehicle body sideslip angle.

What is claimed is:

1. A method of estimating quantities that represent the state of a vehicle, comprising the steps of:

setting initial values to characteristic values related to vehicle characteristics;

calculating required quantities that represent the state of a vehicle or values related to said required quantities that represent the state of the vehicle by applying said initial values to a prescribed movement equation;

detecting measurable quantities that represent the state of the vehicle by sensors;

verifying said required quantities that represent the vehicle state or values related to said required quantities that represent the vehicle state, calculated by said movement equation, using detected values of said measurable quantities that represent the vehicle state for obtaining deviations between calculated values and detected values; and correcting said initial values according to the results of said verification for obtaining adjusted values of said initial values with which the deviations between the calculated quantities and the measured quantities become zero.

2. A method of estimating quantities that represent the state of a vehicle according to claim 1, wherein said required quantities that represent the vehicle state are at least any one of vehicle speed, wheel slip ratio, wheel speed along the ground and longitudinal wheel force, a characteristic value related to said vehicle characteristics is a characteristic value related to tire characteristics, and said measurable quantity that represents the vehicle state is longitudinal acceleration, wherein the longitudinal acceleration is first estimated in a movement equation based on required quantities that represent the vehicle state and that include at least any one of vehicle speed, wheel slip, ratio, wheel speed along the around and longitudinal wheel force differential values of said quantities, and then the longitudinal acceleration is determined by correcting the estimated value by calculating an adjusted value with which a deviation between the estimated value and the detected value is zero.

3. A method of estimating quantities that represent the state of a vehiele according to claim 2, comprising the step of:

controlling the driving force or braking force of a vehicle, based on calculation results of at least any one of said vehicle speed, said wheel slip ratio, said wheel speed along the ground and said longitudinal wheel force.

4. A method of estimating quantities that represent the state of a vehicle according to claim 2, comprising the step of:

controlling the steering angle or steering force of a steering wheel, based on calculation results of at least any one of said vehicle speed, said wheel slip ratio, said wheel speed along the ground and said longitudinal wheel force.

5. A method of estimating quantities that represent the state of a vehicle according to claim 1, wherein said required quantity that represents the vehicle state is vehicle body sideslip angle, said characteristic value related to said vehicle characteristics is said characteristic value related to tire characteristics, and said measurable quantity that represents the vehicle state is lateral acceleration and not longitudinal acceleration.

6. A method of estimating quantities that represent the state of a vehicle comprising the steps of:

setting an initial value to a characteristic value related to the vehicle characteristics;

calculating differential values of required quantities that represent the vehicle state, or differential values of values related to said required quantities that represent the vehicle state, by applying said initial values to a prescribed movement equation;

verifying differential values of said required quantities that represent the vehicle state, or differential values of values related to said required quantities that represent the vehicle state, calculated by said movement equation, using measurable quantities that represent the vehicle state;

correcting said initial values according to the results of said verification, calculating said required quantities that represent the vehicle state or values related to said required quantities that represent the vehicle state, by integrating the differential value of said required quantities that represent the vehicle state or the differential values of the values related to said required quantities that represent the vehicle state, calculated by said movement equation; and using said calculated required quantities that represent the vehicle state, or values related to said required quantities that represent the vehicle stare, for the calculation of the differential values of said required quantities that represent the vehicle state, or the differential values of the values related to said required quantities that represent the vehicle state, in the subsequent processes.

7. A method of estimating quantities that represent the state of a vehicle according to claim 6, wherein said required quantities that represent the vehicle state are at least any one of vehicle speed, wheel slip ratio, wheel speed along the ground and longitudinal wheel force, a characteristic value related to said vehicle characteristics is a characteristic value related to tire characteristics, and said measurable quantity that represents the vehicle state is longitudinal acceleration, wherein the longitudinal acceleration is first estimated in a movement equation based on required quantities that represent the vehicle state and that include at least any one of vehicle speed, wheel slip ratio, wheel speed along the ground and longitudinal wheel force or differential values of said quantities, and then the longitudinal acceleration is determined by correcting the estimated value by calculating an adjusted value with which a deviation between the estimated value and the detected value is zero.

8. A method of estimating quantities that represent the state of a vehicle according to claim 6, wherein said required quantity that represents the vehicle state is vehicle body sideslip angle, said characteristic value related to said vehicle characteristics is said characteristic value related to tire characteristics, and said measurable quantity that represents the vehicle state is lateral acceleration and not longitudinal acceleration.

* * * * *